(12) United States Patent
ReMine et al.

(10) Patent No.: US 11,568,597 B2
(45) Date of Patent: Jan. 31, 2023

(54) AUTOMATED SUPERVISION AND INSPECTION OF ASSEMBLY PROCESS

(71) Applicant: The Boeing Company, Chicago, IL (US)

(72) Inventors: Daniel S. ReMine, Madison, AL (US); Huafeng Yu, Madison, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/523,790

(22) Filed: Jul. 26, 2019

(65) Prior Publication Data

US 2020/0058161 A1    Feb. 20, 2020

Related U.S. Application Data

(60) Provisional application No. 62/718,812, filed on Aug. 14, 2018.

(51) Int. Cl.
*G06T 17/05*  (2011.01)
*G06T 7/593*  (2017.01)
*G06T 7/00*   (2017.01)

(52) U.S. Cl.
CPC .............. *G06T 17/05* (2013.01); *G06T 7/001* (2013.01); *G06T 7/593* (2017.01); *G06T 2200/08* (2013.01); *G06T 2207/10028* (2013.01); *G06T 2207/30108* (2013.01)

(58) Field of Classification Search
None
See application file for complete search history.

(56) References Cited

U.S. PATENT DOCUMENTS

| 6,542,249 | B1* | 4/2003 | Kofman | G01B 11/2513 |
| | | | | 356/601 |
| 2005/0172470 | A1 | 8/2005 | Cobb et al. | |
| 2012/0136470 | A1* | 5/2012 | Deans | G05B 19/41875 |
| | | | | 700/110 |
| 2012/0327215 | A1* | 12/2012 | Case | H05K 13/0815 |
| | | | | 348/92 |
| 2013/0155058 | A1 | 6/2013 | Golparvar-Fard et al. | |
| 2013/0290052 | A1* | 10/2013 | Setting | G06Q 50/16 |
| | | | | 705/7.15 |
| 2014/0192050 | A1* | 7/2014 | Qiu | G06V 20/653 |
| | | | | 345/420 |

(Continued)

OTHER PUBLICATIONS

Yu et al., U.S. Appl. No. 16/523,762, filed Jul. 26, 2019.

(Continued)

*Primary Examiner* — Yingchun He
(74) *Attorney, Agent, or Firm* — Haynes and Boone, LLP

(57) ABSTRACT

A method and apparatus for performing automated supervision and inspection of an assembly process. The method is implemented using a computer system. Sensor data is generated at an assembly site using a sensor system positioned relative to the assembly site. A three-dimensional global map for the assembly site and an assembly being built at the assembly site is generated using the sensor data. A current stage of an assembly process for building an assembly at the assembly site is identified using the three-dimensional global map. A context for the current stage is identified. A quality report for the assembly is generated based on the three-dimensional global map and the context for the current stage.

33 Claims, 20 Drawing Sheets

(56) References Cited

U.S. PATENT DOCUMENTS

| | | | |
|---|---|---|---|
| 2015/0199802 A1* | 7/2015 | Freeman | G06T 7/001 |
| | | | 348/129 |
| 2015/0314891 A1* | 11/2015 | Cobb | B64F 5/10 |
| | | | 700/97 |
| 2016/0334778 A1* | 11/2016 | Cope | G05B 19/401 |
| 2018/0025484 A1 | 1/2018 | Burton | |
| 2018/0082414 A1* | 3/2018 | Rozenberg | G06T 7/75 |
| 2018/0186475 A1 | 7/2018 | Garville | |

OTHER PUBLICATIONS

Geometry Representations with Unsupervised Feature Learning, Yeo-Jin Yoon et al., 978-1-4673-8796-5/16, 2016 IEEE (6 pgs.).
Vote3Deep: Fast Object Detection in 3D Point Clouds Using Efficient Convolutional Neural Networks, Martin Engelcke et al., Oxford Robotics Institute, arXiv:1609.06666v2, 2017 (7 pgs.).
Communication pursuant to Article 94(3) EPC dated Jan. 11, 2022 from European application No. 19191308.6, 6 pages.

\* cited by examiner

AUTOMATED SUPERVISION AND INSPECTION OF ASSEMBLY PROCESS

CROSS-REFERENCE TO RELATED APPLICATION

This application claims the benefit of the filing date of U.S. Provisional Application No. 62/718,812, entitled "Automated Supervision and Inspection of Assembly Process," filed Aug. 14, 2018, which is hereby incorporated by reference in its entirety. Further, this application is related to U.S. Provisional Application No. 62/718,786, entitled "Automated Supervision and Inspection of Assembly Process," filed Aug. 14, 2018, and U.S. patent application Ser. No. 16/523,762, entitled "Automated Supervision and Inspection of Assembly Process," filed on Jul. 26, 2019, which are hereby incorporated by reference in their entireties.

FIELD

The present disclosure relates generally to inspecting assembly sites. More particularly, the present disclosure relates to methods and systems for automated supervision and inspection of an assembly process at an assembly site.

BACKGROUND

Complex structures, such as aircraft structures, may require the assembly of hundreds, thousands, tens of thousands, or even hundreds of thousands of components. The assembly of these types of complex structures may present certain challenges in the manufacturing environment. For example, different types or levels of inspections may be needed at various stages of the assembly process. One inspection step may include determining whether the parts being assembled at a particular stage are indeed the parts expected to be assembled. Another inspection step may include determining whether parts have been assembled in the correct location. Yet another inspection step may include determining whether parts have been assembled at the correct time during the assembly process. One inspection step may include determining whether the assembly of parts meets safety requirements, quality requirements, or both.

Some currently available methods of inspection involve manual inspection of assemblies by a human operator. But this type of manual inspection may be prone to human error and may be less accurate than desired. Further, manual inspection may take longer than desired and may be more expensive than desired. For example, when an undesired feature is identified via manual inspection, disassembly may be required in order to identify the cause of the undesired feature. This disassembly process may be more time-consuming and costly than desired. Thus, one or more apparatuses and methods for addressing the above-described issues may be desired.

SUMMARY

In one example embodiment, a method is provided for performing automated supervision and inspection of an assembly process. The method is implemented using a computer system. Sensor data is generated at an assembly site using a sensor system positioned relative to the assembly site. A three-dimensional global map for the assembly site and an assembly being built at the assembly site is generated using the sensor data. A current stage of an assembly process for building an assembly at the assembly site is identified using the three-dimensional global map. A context for the current stage is identified. A quality report for the assembly is generated based on the three-dimensional global map and the context for the current stage.

In another example embodiment, a method is provided for performing automated supervision and inspection of an assembly process. The method is implemented using a computer system. Sensor data is generated at an assembly site using a sensor system positioned relative to the assembly site. A three-dimensional global map for the assembly site and an assembly being built at the assembly site is generated using the sensor data. A current stage of an assembly process for building an assembly at the assembly site is identified using the three-dimensional global map and assembly information stored in a data repository. A context is identified for the current stage. A quality report corresponding to the current stage of the assembly process is generated based on the three-dimensional global map, the assembly information, and the context for the current stage. A record corresponding to the current stage of the assembly process is stored in the data repository to thereby build a history of records for the assembly process. The record includes at least a portion of the sensor data and the quality report.

In another example embodiment, a system for automated supervision and inspection of an assembly process includes a sensor system and a computer system. The sensor system is positioned relative to an assembly site and an assembly being built at the assembly site. The computer system generates a three-dimensional global map for the assembly site and an assembly being built at the assembly site using sensor data generated by the sensor system. The computer system identifies a current stage of the assembly process for building the assembly at the assembly site based on the three-dimensional global. The computer system identifies a context for the current stage. The computer system generates a quality report for the assembly based on the three-dimensional global and the context for the current stage.

The features and functions may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of example embodiments when read in conjunction with the accompanying drawings, wherein:

DETAILED DESCRIPTION

The example embodiments described below provide methods and systems for automating the supervision and inspection of an assembly process at an assembly site. These methods and systems use machine learning, computer vision, and other artificial intelligence technologies to automate supervision and inspection of the assembly process. Further, these methods and systems provide an automated way of identifying that parts are assembled according to predefined quality requirements, in the right locations, and at the correct times during the assembly process.

The automated supervision and inspection system provided by the example embodiments improves quality control of an assembly process in a manner that reduces the need for human intervention in the inspection process. By reducing this need for human intervention, human-related errors may be reduced. Further, the automated supervision and inspection system provides cost- and time-savings. For example, the automated supervision and inspection system provides a method for identifying the root cause of an issue without requiring extensive disassembly or reversal of actual assembly steps.

Figure 1:
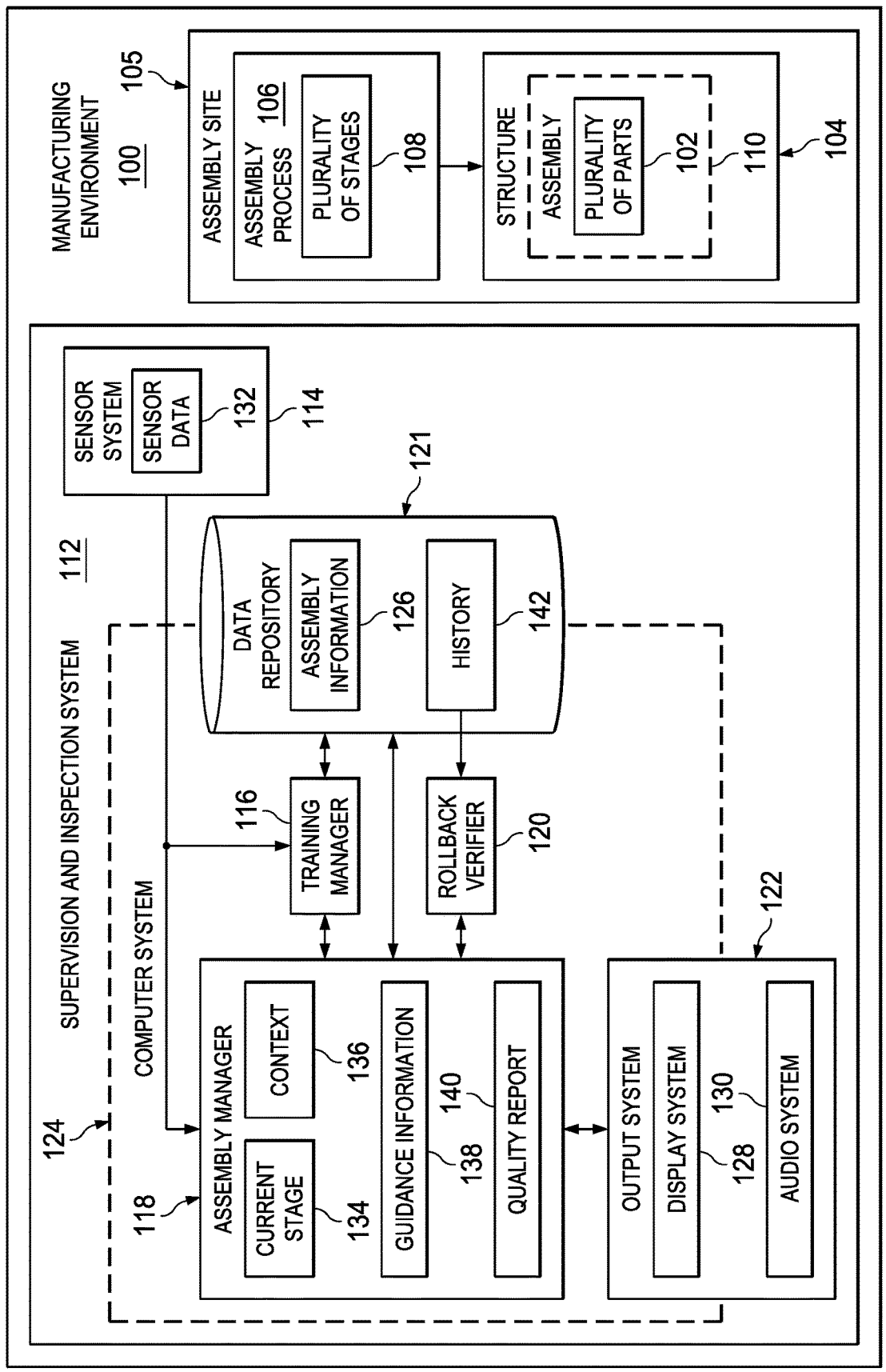
FIG. 1 is a block diagram of a manufacturing environment in accordance with an example embodiment.

FIG. 1 is a block diagram of a manufacturing environment in accordance with an example embodiment. Manufacturing environment 100 is an example of one type of manufacturing environment in which plurality of parts 102 may be assembled to form structure 104. Structure 104 may take a number of different forms. For example, structure 104 may be an aircraft, a wing, a wing structure, a fuselage, a fuselage structure, a frame, a stabilizer, or some other type of structure 104. In some cases, a part of plurality of parts 102 may also be referred to as a piece, a component, an element, a member, or some other type of unit.

Plurality of parts 102 may be assembled at assembly site 105 within manufacturing environment 100. In some illustrative examples, assembly site 105 may be one of multiple assembly sites within manufacturing environment 100. Assembly site 105 may include, for example, a ground area, a platform, scaffolding, or some other type of site on which plurality of parts 102 is assembled.

Plurality of parts 102 may be assembled to form structure 104 according to assembly process 106. Assembly process 106 may include plurality of stages 108. As used herein, a stage of plurality of stages 108 may be a single stage of assembly process 106, a sequence of stages, a sequence of sub-stages, a stage in a sub-assembly process, a step in assembly process 106 or a sub-assembly process, or two or more steps to be performed in parallel during assembly process 106. At any given stage of assembly process 106, prior to and up to completion, structure 104 may be referred to as assembly 110. In some cases, assembly 110 may also be referred to as a "build."

Supervision and inspection system 112 is used to supervise assembly process 106 and to perform inspections during assembly process 106. Supervision and inspection system 112 may be an automated system. In particular, supervision and inspection system 112 automates the supervision of assembly process 106 and automates inspections during assembly process 106 to reduce or, in some cases, even eliminate the need for human intervention.

In these illustrative examples, supervision and inspection system 112 includes sensor system 114, training manager 116, assembly manager 118, rollback verifier 120, data repository 121, and output system 122. Sensor system 114 may include any number of or combination of sensors. For example, sensor system 114 may include at least one of an imaging device, a radar sensor, a sonar sensor, a light detection and ranging (LiDAR) sensor, or some other type of sensor. An imaging device may include, for example, without limitation, a camera, a stereo camera, a video camera, an infrared camera, some other type of imaging device, or a combination thereof. In one illustrative example, sensor system 114 includes a set of imaging systems, each imaging system including one or more imaging devices. A set of items, such as a set of imaging systems, may include one or more items.

Training manager 116, assembly manager 118, and rollback verifier 120 may be implemented using software, hardware, firmware, or a combination thereof. When software is used, the operations performed by each of training manager 116, assembly manager 118, or rollback verifier 120 may be implemented using, for example, without limitation, program code configured to run on a processor unit. When firmware is used, the operations performed by each of training manager 116, assembly manager 118, or rollback verifier 120 may be implemented using, for example, without limitation, program code and data and stored in persistent memory to run on a processor unit.

When hardware is employed, the hardware may include one or more circuits that operate to perform the operations performed by each of training manager 116, assembly manager 118, or rollback verifier 120. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In these illustrative examples, assembly manager 118 and rollback verifier 120 may be implemented using computer system 124. Computer system 124 may include a single computer or multiple computers in communication with each other. In some embodiments, computer system 124 may include a laptop, a tablet, a smartphone, or some other type of mobile device.

In some embodiments, a portion of computer system 124 may be located remotely with respect to another portion of computer system 124. For example, computer system 124 may include a computer positioned at or around assembly site 105 within manufacturing environment 100 and a server system located remotely with respect to the computer. The server system may be located within or outside of manufacturing environment 100. In some cases, training manager 116 may be implemented using a first computer, assembly manager 118 may be implemented using a second computer, and rollback verifier 120 may be implemented using a third computer. Thus, computer system 124 may be used in a number of different ways to implement assembly manager 118 and rollback verifier 120.

Data repository 121 may include one or more databases, associative memory, some other type of data structure, or a combination thereof. Data repository 121 may be in communication with training manager 116, assembly manager 118, rollback verifier 120, or a combination thereof. Data repository 121 may be part of computer system 124 in some examples. In some examples, data repository 121 or at least a portion of data repository 121 is located remotely with respect to assembly site 105.

Data repository 121 stores assembly information 126. Examples of the types of assembly information 126 that may be stored in data repository 121 are described in FIG. 2 below.

Output system 122 may be in communication with training manager 116, assembly manager 118, rollback verifier 120, or a combination thereof. Output system 122 may include one or more output devices. In some illustrative examples, a portion or all of output system 122 may be considered part of computer system 124. In these illustrative examples, output system 122 may include at least one of display system 128, audio system 130, or some other type of output device. Display system 128 may include, for example, at least one of a screen, a touchscreen, a monitor, a head-mounted display device, or some other type of display device. Audio system 130 may include, for example, at least one of a microphone, a speaker, or some other type of audio device.

Sensor system 114 may be used to generate sensor data 132 before assembly process 106, during assembly process 106, or both. Sensor data 132 may include two-dimensional (2D) imaging data, three-dimensional (3D) imaging data, one or more other types of sensor data, or a combination thereof. Sensor data 132 is sent to training manager 116 and assembly manager 118 for processing. In some illustrative examples, a portion or all of sensor data 132 is stored in data repository 121.

Before assembly process 106 begins, training manager 116 uses assembly information 126, and, optionally, sensor data 132, to train assembly manager 118 to identify the various parts of plurality of parts 102 to be assembled to form structure 104 and the various stages of plurality of stages 108. Additionally, training manager 116 uses assembly information 126, and, optionally, sensor data 132, to train assembly manager 118 to assess quality metrics for assembly 110.

Assembly manager 118 processes sensor data 132 to identify current stage 134 of assembly process 106. Assembly manager 118 then identifies context 136 for current stage 134. Context 136 may include, for example, at least one of a nominal condition for assembly 110 at current stage 134, a nominal condition for each part expected to be present at current stage 134, selected tolerances for the nominal condition for assembly 110 at current stage 134, selected tolerances for the quality metrics pre-identified for assembly 110, an identification of step(s) completed prior to current stage 134, an identification of step(s) to be completed during current stage 134, an identification of next step(s) to be completed after current stage 134, or other information.

Context 136 may include information that a human operator would be either completely unable to identify or would be unable to quickly and easily identify based on viewing or visualizing assembly site 105. For example, when assembly process 106 includes a multitude of stages, a human operator may be unable to readily identify current stage 134 or the selected tolerances for the quality metrics pre-identified for assembly 110 for current stage 134, the step(s) completed prior to current stage 134, the step(s) to be completed during current stage 134, or next step(s) to be completed after current stage 134.

Based on context 136 identified for current stage 134, assembly manager 118 may output guidance information 138 via output system 122. Guidance information 138 may include, for example, a listing of the steps to be performed during current stage 134, a listing of next steps to be performed after current stage 134, or both. Guidance information 138 is used to inform one or more human operators on the tasks to be performed during assembly process 106.

Further, based on context 136 identified for current stage 134, assembly manager 118 may evaluate assembly 110 at current stage 134 and generate quality report 140. Quality report 140 may also be referred to as a quality assessment. Quality report 140 indicates whether any relevant issues of interest relating to the quality of assembly 110 are present.

For each stage of assembly process 106 identified by assembly manager 118, assembly manager 118 stores the corresponding quality report 140 in data repository 121 to build history 142 of reports for the assembly process 106. If at current stage 134, assembly manager 118 detects an issue of interest, rollback verifier 120 may roll back through the history 142 of quality reports stored in data repository 121 in reverse order to identify the root cause of the issue of interest.

Figure 2:
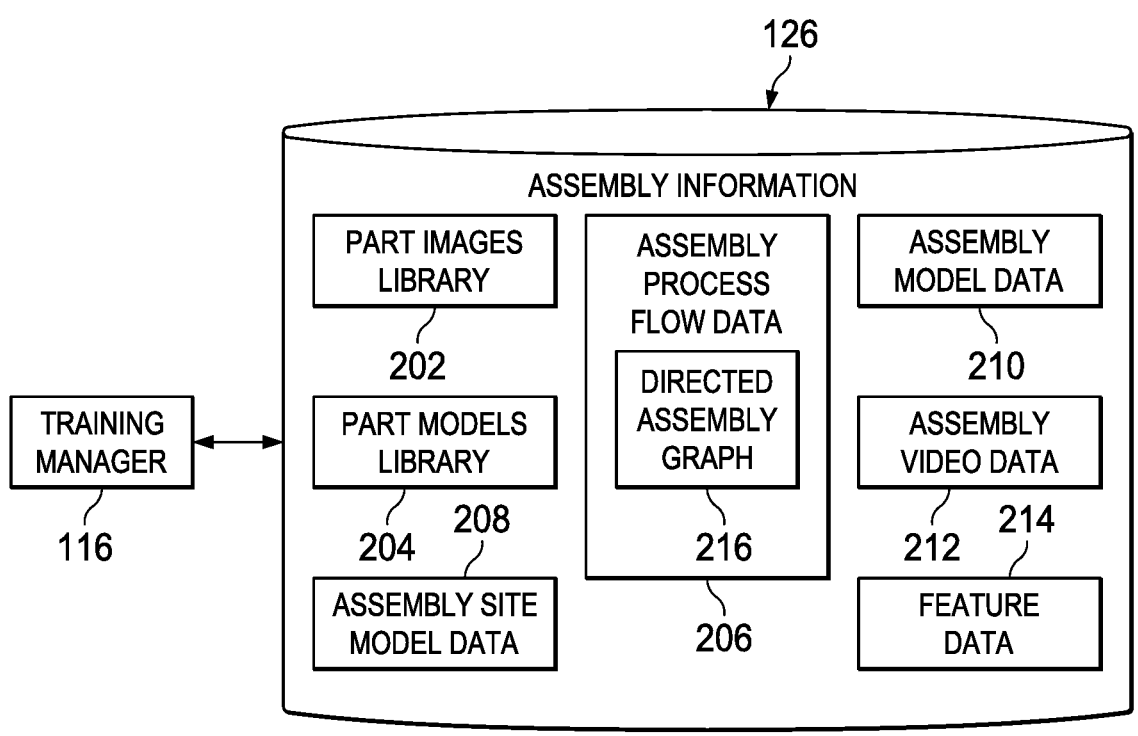
FIG. 2 is a block diagram of the training manager and data repository from FIG. 1 in accordance with an example embodiment.

FIG. 2 is a block diagram of training manager 116 and data repository 121 from FIG. 1 in accordance with an example embodiment. Before assembly process 106 from FIG. 1 is performed at assembly site 105, training manager 116 uses assembly information 126 stored in data repository 121 to train assembly manager 118 in FIG. 1 to evaluate each of plurality of stages 108 in FIG. 1.

Training manager 116 may use any number of algorithms and techniques to perform this training. For example, training manager 116 may use at least one of machine learning, deep learning, computer vision, some other type of computational learning, some other type of artificial intelligence learning, or a combination thereof.

Assembly information 126 stored in data repository 121 may include various types of information. For example, assembly information 126 may include part images library 202, part models library 204, assembly process flow data 206, assembly site model data 208, assembly model data 210, and assembly video data 212, feature data 214, or a combination thereof.

Part images library 202 may include, for example, one or more images for at least a portion of the parts of plurality of parts 102 in FIG. 1. In some cases, part images library 202 may include an image for each of plurality of parts 102. In these illustrative examples, part images library 202 may also include images of parts captured from previously completed assembly processes.

Part models library 204 may include, for example, one or more models for at least a portion of the parts of plurality of parts 102 in FIG. 1. In some cases, part models library 204 may include a model for each of plurality of parts 102. A model of a part may be, for example, a computer-aided design (CAD) model.

Assembly process flow data 206 may include information about the flow or sequence of plurality of stages 108 in assembly process 106 from FIG. 1. In one illustrative example, assembly process flow data 206 takes the form of directed assembly graph 216 that represents the flow or sequence according to which plurality of stages 108 of assembly process 106 should progress. In some cases, this directed assembly graph 216 may include sub-flows representing sub-stages that act in parallel with each other.

Assembly site model data 208 may include, for example, a baseline model of assembly site 105 from FIG. 1 and updates to the baseline model for each of plurality of stages 108 of assembly process 106. In some illustrative examples, assembly site model data 208 includes a model of assembly site 105 for each stage of plurality of stages 108. The models included in assembly site model data 208 may be, for example, three-dimensional models. Further, in some cases, these models may include representations of the parts involved in and already part of each stage of plurality of stages 108. In other cases, the models are linked to the CAD models of the parts.

Assembly model data 210 may include any number of models that represent the various states of assembly 110 in plurality of stages 108. In one illustrative example, assembly model data 210 includes a baseline model for assembly 110 at a first stage of plurality of stages 108 and updates to the baseline model reflecting the addition of one or more parts to assembly 110 at each of plurality of stages 108. Assembly video data 212 may include a video of the entire assembly process 106 or multiple videos for the various stages of assembly process 106 captured during a previously performed assembly process 106.

Feature data 214 may include information about various features. Features may include cracks, dents, twists, a surface level feature, other types of features, or a combination thereof. Feature data 214 may include images of these features. In these illustrative examples, feature data 214 includes selected tolerances for each of the features. As one illustrative example, feature data 214 may include selected tolerances for a length of crack, selected tolerances for a depth of a dent, and other types of selected tolerances.

In these illustrative examples, training manager 116 may use sensor data 132 that is generated over time to update assembly information 126. This type of updating improves the overall accuracy and efficiency with which analysis of sensor data 132 may be performed.

Figure 3:
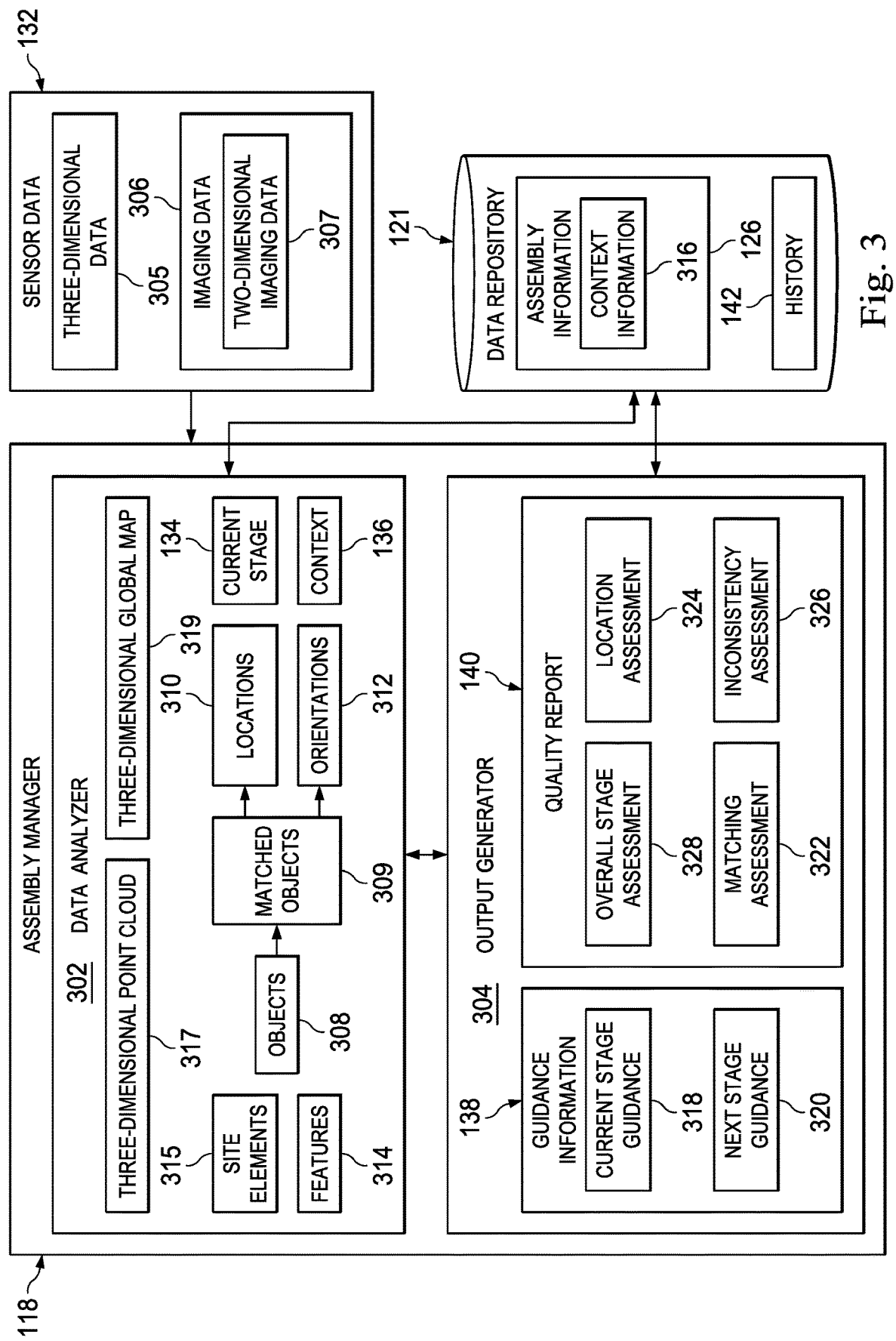
FIG. 3 is a block diagram of the assembly manager from FIG. 1 in accordance with an example embodiment.

FIG. 3 is a block diagram of assembly manager 118 from FIG. 1 in accordance with an example embodiment. Assembly manager 118 may include data analyzer 302 and output generator 304.

Data analyzer 302 uses sensor data 132 and assembly information 126 stored in data repository 121 to identify each stage of plurality of stages 108 during assembly process 106. For example, at any given point in time during assembly process 106, data analyzer 302 may use any number of algorithms or techniques to identify current stage 134 of assembly process 106.

In one illustrative example, sensor data 132 includes imaging data 306 for assembly site 105. Imaging data 306 includes two-dimensional images, three-dimensional images, video, or a combination thereof of assembly site 105. For example, sensor data 132 may include imaging data 306 in the form of two-dimensional imaging data 307, which may include two-dimensional images, two-dimensional video, or both. In other illustrative examples, sensor data 132 includes three-dimensional data 305, which may include data generated by at least one of a LiDAR sensor, a radar sensor, a sonar sensor, or a stereo camera. Three-dimensional data 305 may include range data. Accordingly, any number of or combination of these types of sensors may be positioned relative to assembly site 105 and used to generate three-dimensional data 305.

When imaging data 306 includes two-dimensional imaging data 307, data analyzer 302 may use at least one of machine learning, deep learning, computer vision, a customized learning technique, some other type of computational learning, some other type of artificial intelligence learning, or a combination thereof in combination with assembly information 126 to detect and identify objects 308 in imaging data 306.

Data analyzer 302 matches the detected objects 308 to parts based on assembly information 126. For example, data analyzer 302 may use part images library 202, part models library 204, or both to match objects 308 to parts. This matching may be performed based on, for example, form, size, color, identifying marks, or some other type of point of comparison.

Once objects 308 are part-matched, they may be referred to as matched objects 309. In some cases, not all of objects 308 are able to be matched to corresponding parts. Thus, matched objects 309 may include all or a subset of objects 308.

Data analyzer 302 identifies locations 310 and orientations 312 of matched objects 309 with respect to a reference coordinate system for assembly site 105. For example, data analyzer 302 may first identify locations 310 of matched objects 309 in a particular image. Data analyzer 302 may synchronize a viewpoint from which that image was generated to a corresponding location of the imaging device that generated the image relative to a model of assembly site 105. Ray tracing or some other technique may be used to then determine the location of each matched object. The orientation of that matched object may then be determined. In other illustrative examples, data analyzer 302 identifies locations 310 and orientations 312 of matched objects 309 relative to a reference coordinate system for assembly 110.

Data analyzer 302 may identify one or more features 314 in imaging data 306. Features 314 may be features of a particular part, surface, or other portion of assembly 110. Features 314 may include, for example, without limitation, cracks, dents, twists, a surface level feature, or some other type of feature. A surface level feature may be, for example, a level of flushness, a level of smoothness, or some other type of surface feature. A feature may be considered an undesired feature or inconsistency when that feature is outside of selected tolerances.

Data analyzer 302 may use at least one of machine learning, deep learning, computer vision, a customized learning technique, some other type of computational learning, some other type of artificial intelligence learning, or a combination thereof in combination with assembly information 126 to detect and identify objects 308 in imaging data 306.

In some illustrative examples, data analyzer 302 also identifies site elements 315 in imaging data 306. Site elements 315 may include tools, identifying marks, labels, robots, and elements other than parts that may be present at assembly site 105.

Using some combination of the identification of matched objects 309, locations 310 of matched objects 309, orientations 312 of matched objects 309, and site elements 315, data analyzer 302 is then able to identify current stage 134 of assembly process 106. For example, data analyzer 302 may use assembly information 126 in combination with the above information to identify current stage 134. More specifically, data analyzer 302 may use assembly process flow data 206, assembly site model data 208, assembly model data 210, assembly video data 212, some other type of information, or a combination thereof from FIG. 2 to identify current stage 134. In some cases, the identification of current stage 134 may be referred to as an assembly localization calibration or an assembly stage calibration.

Current stage 134 may also be identified using sensor data 132 in the form of three-dimensional data 305. When sensor data 132 includes three-dimensional data 305, data analyzer 302 uses three-dimensional data 305 to generate three-dimensional point cloud 317 of assembly site 105 and assembly 110 being built at assembly site 105. Data analyzer 302 then uses three-dimensional point cloud 317 to generate three-dimensional global map 319. Three-dimensional global map 319 may be a representation of assembly site 105 and assembly 110 being built at assembly site 105. This representation integrates information from three-dimensional data 305 with, for example, one or more three-dimensional models (e.g., CAD models) included in assembly information 126 stored in data repository 121.

Data analyzer 302 uses three-dimensional global map 319 to detect objects 308 and, in some cases, site elements 315. Data analyzer 302 may then match objects 308 using processes similar to those described above to identify matched objects 309. Data analyzer 302 may then identify current stage 134 based on matched objects 309 in a manner similar to the manner described above.

In these example embodiments, objects 308, features 314, and site elements 315 may be identified using three-dimensional global map 319 and at least one three-dimensional comparison algorithm. For example, three-dimensional global map 319 may be compared to models stored as part of assembly site model data 208, assembly model data 210, or both in FIG. 2. Further, three-dimensional global map 319 may be analyzed using assembly video data 212, feature data 214, or both in FIG. 2.

Using three-dimensional global map 319 may allow different or additional objects, features, or site elements to be identified as compared with the use of two-dimensional imaging data 307. For example, some features that may be more difficult to detect through the processing of two-dimensional imaging data 307 may be easier or more readily detectable using three-dimensional global map 319 generated through the processing of three-dimensional data 305.

As one illustrative example, certain types of dents, shims, connections, fastenings, farings, and welds may be more readily or better detected using three-dimensional global map 319. In some cases, at least one of an object, a feature, or a site element that is not able to be detected through the processing of two-dimensional imaging data 307 may be detected using three-dimensional global map 319.

Once current stage 134 has been identified, data analyzer 302 uses context information 316 stored in data repository 121 to identify context 136 for current stage 134. Context information 316 may also include a portion of assembly information 126. For example, context information 316 may include quality metrics for each stage of plurality of stages 108 of assembly process 106.

As discussed above, context 136 for current stage 134 may include at least one of a nominal condition for assembly 110 at current stage 134, a nominal condition for each part expected to be present at current stage 134, selected tolerances for the nominal condition for assembly 110 at current stage 134, selected tolerances for the quality metrics pre-identified for assembly 110, an identification of step(s) completed prior to current stage 134, an identification of step(s) to be completed during current stage 134, an identification of next step(s) to be completed after current stage 134, or other information.

Once context 136 has been identified, output generator 304 generates guidance information 138 and quality report 140. Guidance information 138 is used to inform the one or more human operators involved in assembly process 106. Guidance information 138 may include, for example, current stage guidance 318, next stage guidance 320, or both.

Current stage guidance 318 may include, for example, a listing of the steps to be performed during current stage 134. In some cases, current stage guidance 318 includes instructions on how to perform certain tasks for current stage 134. Current stage guidance 318 may include one or more images, video, or both to help guide a human operator on how to perform a particular task. Guidance information 138 may be displayed through display system 128 from FIG. 1. In some cases, current stage guidance 318 includes audio guidance, such as audio instructions on how to perform certain tasks during current stage 134 of assembly process 106. These audio instructions may be played for a human operator through audio system 130 from FIG. 1.

Next stage guidance 320 may include, for example, a listing of the steps to be performed during a next stage that will follow current stage 134. Data analyzer 302, output generator 304, or both may identify this next stage using, for example, directed assembly graph 216 from FIG. 2. In some illustrative examples, next stage guidance 320 includes instructions on how to perform certain tasks for the next stage. Next stage guidance 320 may include one or more images, video, or both to help guide a human operator on how to perform a particular task.

Guidance information 138 may be presented to a human operator through output system 122 described in FIG. 1. For example, guidance information 138 may be displayed through display system 128 from FIG. 1. In some cases, current stage guidance 318 may include audio guidance, such as audio instructions on how to perform certain tasks during current stage 134 of assembly process 106. These audio instructions may be played for a human operator through audio system 130 from FIG. 1.

Further, based on context 136 identified for current stage 134, matched objects 309, locations 310, orientations 312, and site elements 315, output generator 304 evaluates assembly 110 at current stage 134 and generates quality report 140. Quality report 140 indicates whether any relevant issues of interest relating to the quality of assembly 110 are present. For example, quality report 140 includes at least one of matching assessment 322, location assessment 324, inconsistency assessment 326, or some other type of assessment.

Matching assessment 322 may indicate whether one or more of objects 308 were unable to be matched to a corresponding part. In some illustrative examples, matching assessment 322 may also indicate whether one or more of matched objects 309 do not match the parts expected to be present at current stage 134 of assembly process 106. Location assessment 324 indicates whether matched objects 309 have been assembled in the correct or incorrect locations relative to assembly 110. Inconsistency assessment 326 indicates if features 314 have been identified and if so, whether features 314 are outside of selected tolerances. Data analyzer 302, output generator 304, or both may use feature data 214 from FIG. 2 to determine whether features 314 are outside of selected tolerances.

In some cases, quality report 140 may include overall stage assessment 328. Overall stage assessment 328 may be, for example, an indication of whether current stage 134 is progressing within selected tolerances. In some cases, overall stage assessment 328 may be a grade selected from one of "pass," "borderline," and "fail."

Quality report 140 may be presented to a human operator via output system 122 in different ways. In one illustrative example, quality report 140 may be presented using graphical indicators overlaid on an image of assembly site 105 or assembly 110 displayed in display system 128. For example, objects identified in the image that have been matched to correct parts and to correct locations and orientations may be indicated with a first type of graphical indicator (e.g., green circle around the object, green arrow, etc.). Objects identified in the image that have been mismatched, are in the wrong locations, or have the wrong orientations may be indicated with a second type of graphical indicator (e.g., red circle around the object, red arrow, etc.). As described above, a mismatched object may be one that matched to a part that should not be present at current stage 134 or that did not match to any part.

Sensor data 132 and the various pieces of information generated by assembly manager 118 are stored in data repository 121. For example, stage record 330 may be stored in data repository 121 in association with current stage 134. Stage record 330 may include sensor data 132, an identification of objects 308, an identification of matched objects 309, locations 310, orientations 312, and quality report 140. In some cases, stage record 330 may include guidance information 138. Once stored in data repository 121, stage record 330 becomes part of history 142. Thus, this type of history 142 of records includes a record for each stage of plurality of stages 108 identified and analyzed.

The illustrations in FIGS. 1-3 are not meant to imply physical or architectural limitations to the manner in which an example embodiment may be implemented. Other components in addition to or in place of the ones illustrated may be used. Some components may be optional. Further, the blocks are presented to illustrate some functional components. One or more of these blocks may be combined, divided, or combined and divided into different blocks when implemented in a different example embodiment.

Figure 4:
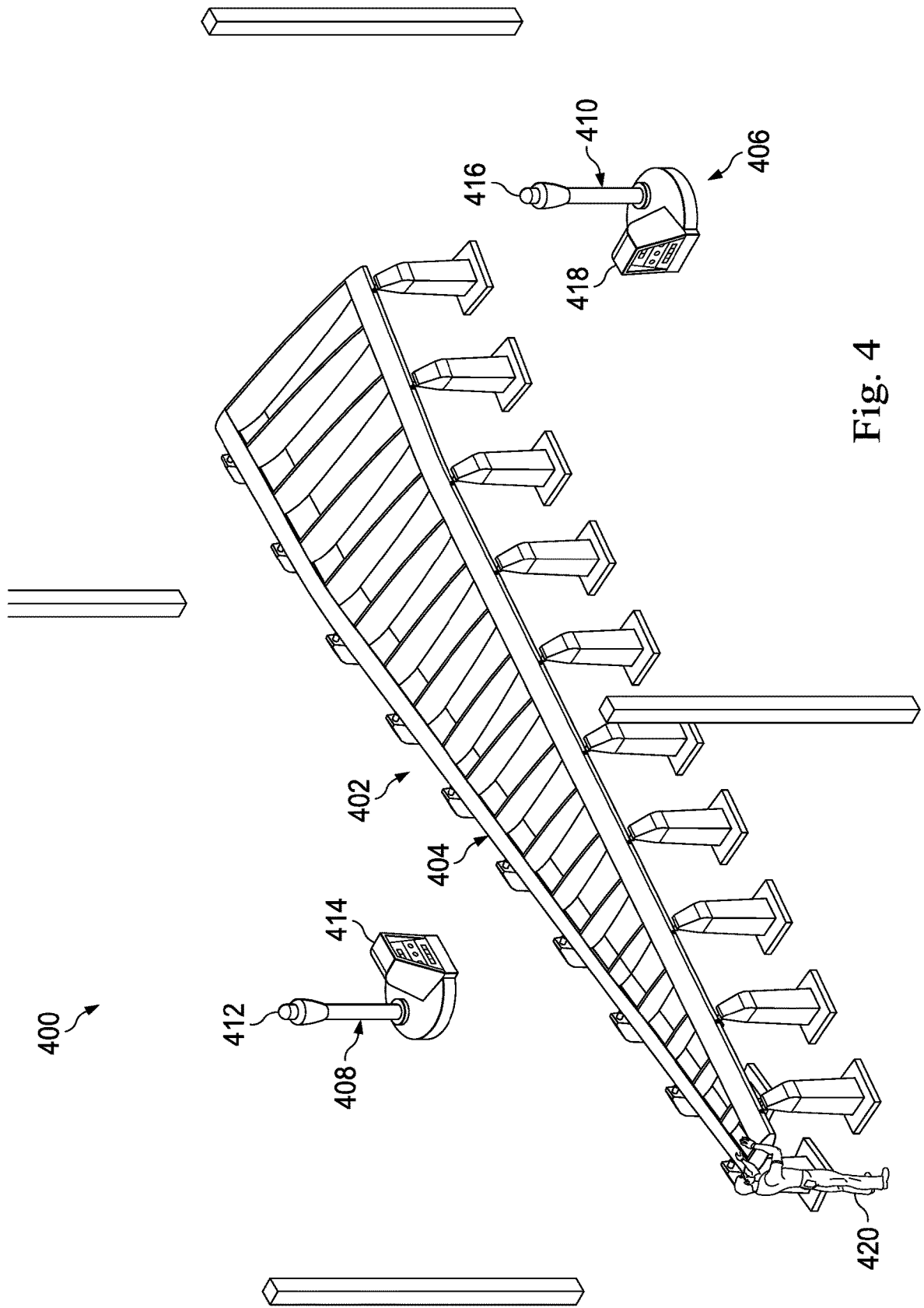
FIG. 4 is an illustration of an assembly site in accordance with an example embodiment.

FIG. 4 is an illustration of an assembly site in accordance with an example embodiment. Assembly site 400 may be an example of one implementation for assembly site 105 described in FIG. 1. Wing assembly 402 is being built at assembly site 400 to ultimately form a wing. Wing assembly 402 is an example of one implementation for assembly 110 described in FIG. 1. Wing assembly 402 is comprised of plurality of parts 404.

As depicted, supervision and inspection system 406 is at least partially present at assembly site 400. Supervision and inspection system 406 is an example of one implementation for supervision and inspection system 112 in FIG. 1. Supervision and inspection system 406 includes inspection platform 408 and inspection platform 410. In this illustrative example, inspection platform 408 and inspection platform 410 may be implemented using stationary platforms. In other illustrative examples, inspection platform 408 and inspection platform 410 may be implemented using mobile platforms. Although only two platforms are shown in FIG. 4, any number of platforms may be present at assembly site 400.

In this illustrative example, inspection platform 408 includes rotating camera 412 and control system 414. Similarly, inspection platform 410 includes rotating camera 416 and control system 418. Rotating camera 412 and rotating camera 416 are an example of one implementation for sensor system 114 in FIG. 1. Rotating camera 412 and rotating camera 416 may generate two-dimensional images. In other illustrative examples, inspection platform 408 and inspection platform 410 may be outfitted with three-dimensional camera systems, LiDAR sensor systems, or other types of sensors.

Control system 414 and control system 418 may each include a processor, memory, and communications units. Control system 414 and control system 418 may control the operation of rotating camera 412 and rotating camera 416, respectively. Further, control system 414 and control system 418 may process the imaging data generated by these cameras and send the processed data to a remote computer system (e.g., computer system 124 in FIG. 1) for further processing. In other illustrative examples, the processors of control system 414 and control system 418 communicate with each other as part of computer system 124 described in FIG. 1.

In some cases, a lighting device (not shown) may be attached to or integral with each of inspection platform 408 and inspection platform 410. The lighting device may help rotating camera 412 and rotating camera 416 to capture higher quality images.

The imaging data generated by rotating camera 412 and rotating camera 416 includes images of assembly site 400 and wing assembly 402 that are used to perform automated inspections during the building of wing assembly 402. Further, the imaging data is used to provide guidance to human operator 420 based on the current stage of assembly.

Figure 5:
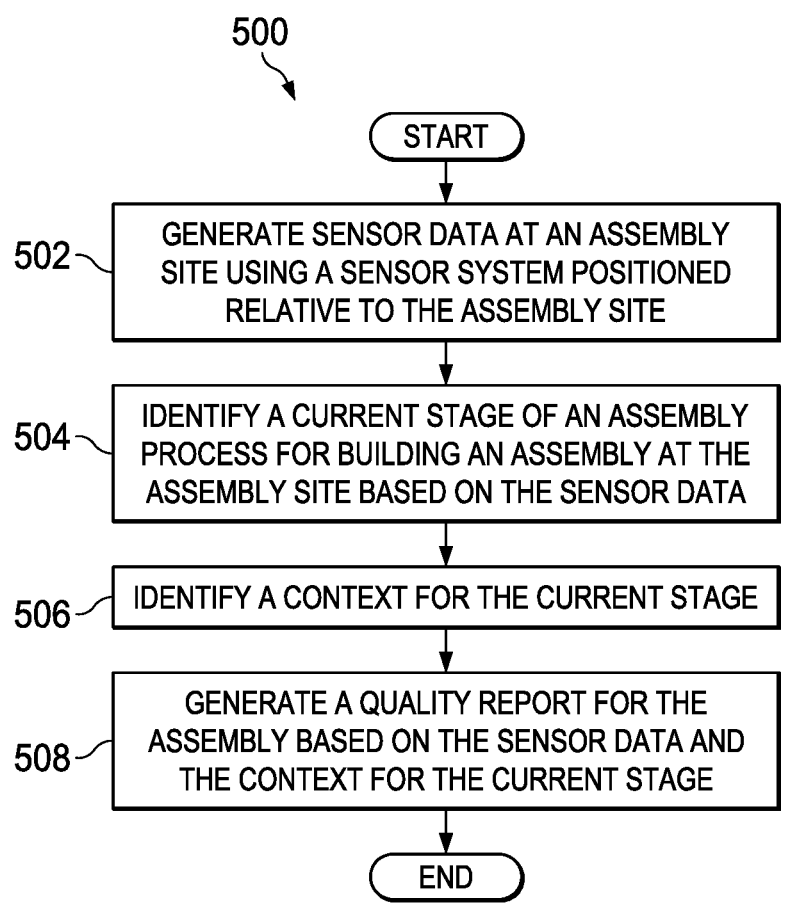
FIG. 5 is a flowchart of a process for performing automated supervision and inspection of an assembly process in accordance with an example embodiment.

FIG. 5 is a flowchart of a process for performing automated supervision and inspection of an assembly process in accordance with an example embodiment. Process 500 illustrated in FIG. 5 may be performed using supervision and inspection system 112 described in FIGS. 1-3. Process 500 may be used to automate the supervision and inspection of assembly process 106 at assembly site 105 in FIG. 1.

Process 500 may begin by generating sensor data at an assembly site using a sensor system positioned relative to the assembly site (operation 502). In one illustrative example, the sensor system includes a plurality of cameras that are positioned relative to the assembly site and the assembly being built at the assembly site. In some cases, one or more of the cameras may be rotating cameras.

A current stage of an assembly process for building the assembly at the assembly site is identified using the sensor data (operation 504). Thereafter, a context is identified for the current stage of the assembly process (operation 506). As described above, a stage of the assembly process may be a single stage, a sequence of stages, a sequence of sub-stages, a stage in a sub-assembly process, a step in the assembly process, a step in a sub-assembly process, or two or more steps or sub-stages to be performed in parallel during the assembly process.

A quality report is then generated for the assembly based on the sensor data and the context for the current stage (operation 508), with the process terminating thereafter. The quality report is an automated report that includes assessments indicating whether at least one issue of interest is present. The issue of interest may be an improper part, an improper part location, an improper orientation, a crack, a dent, a twist, a surface inconsistency, or a combination thereof. Process 500 may be repeated for each stage of the assembly process.

Figure 6:
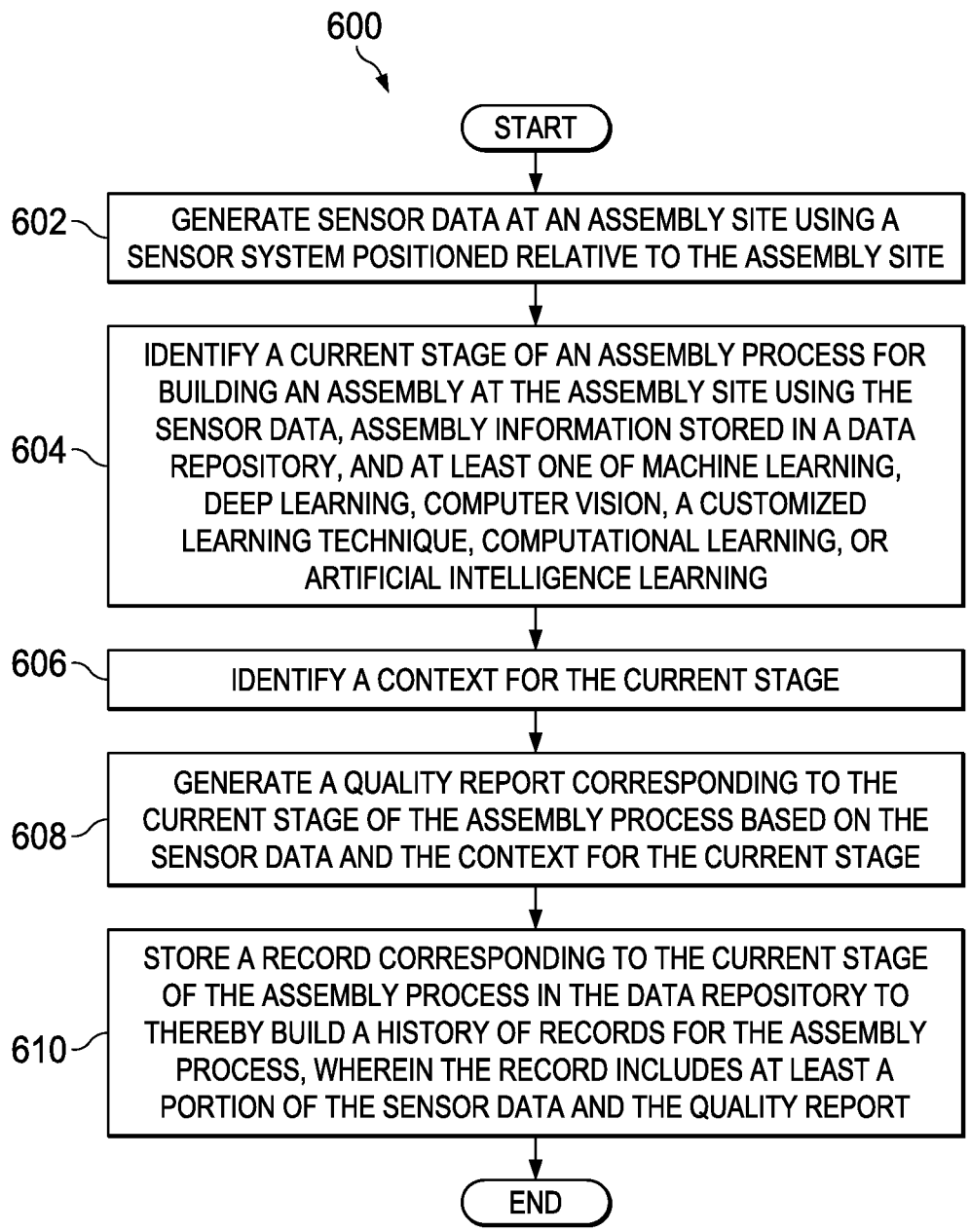
FIG. 6 is a flowchart of a process for performing automated supervision and inspection of an assembly process in accordance with an example embodiment.

FIG. 6 is a flowchart of a process for performing automated supervision and inspection of an assembly process in accordance with an example embodiment. Process 600 illustrated in FIG. 6 may be performed using supervision and inspection system 112 described in FIGS. 1-3. Process 600 may be used to automate the supervision and inspection of assembly process 106 at assembly site 105 in FIG. 1.

Process 600 begins by generating sensor data at an assembly site using a sensor system positioned relative to the assembly site (operation 602). In these illustrative examples, the sensor system includes multiple cameras that are placed in predetermined, fixed positions relative to the assembly being built at the assembly site. These positions are selected to provide images that provide the most information and optimal angles for evaluating the assembly process. The cameras may generate images, video, or both.

Next, a current stage of the assembly process for building an assembly at the assembly site is identified using the sensor data, assembly information stored in a data repository, and at least one of machine learning, deep learning, computer vision, a customized learning technique, computational learning, or artificial intelligence learning (operation 604). Thereafter, a context is identified for the current stage (operation 606).

A quality report corresponding to the current stage of the assembly process is generated based on the sensor data and the context for the current stage (operation 608). A record corresponding to the current stage of the assembly process is stored in the data repository to thereby build a history of records for the assembly process (operation 610), with the process terminating thereafter. The record includes at least a portion of the sensor data and the quality report.

Figure 7:
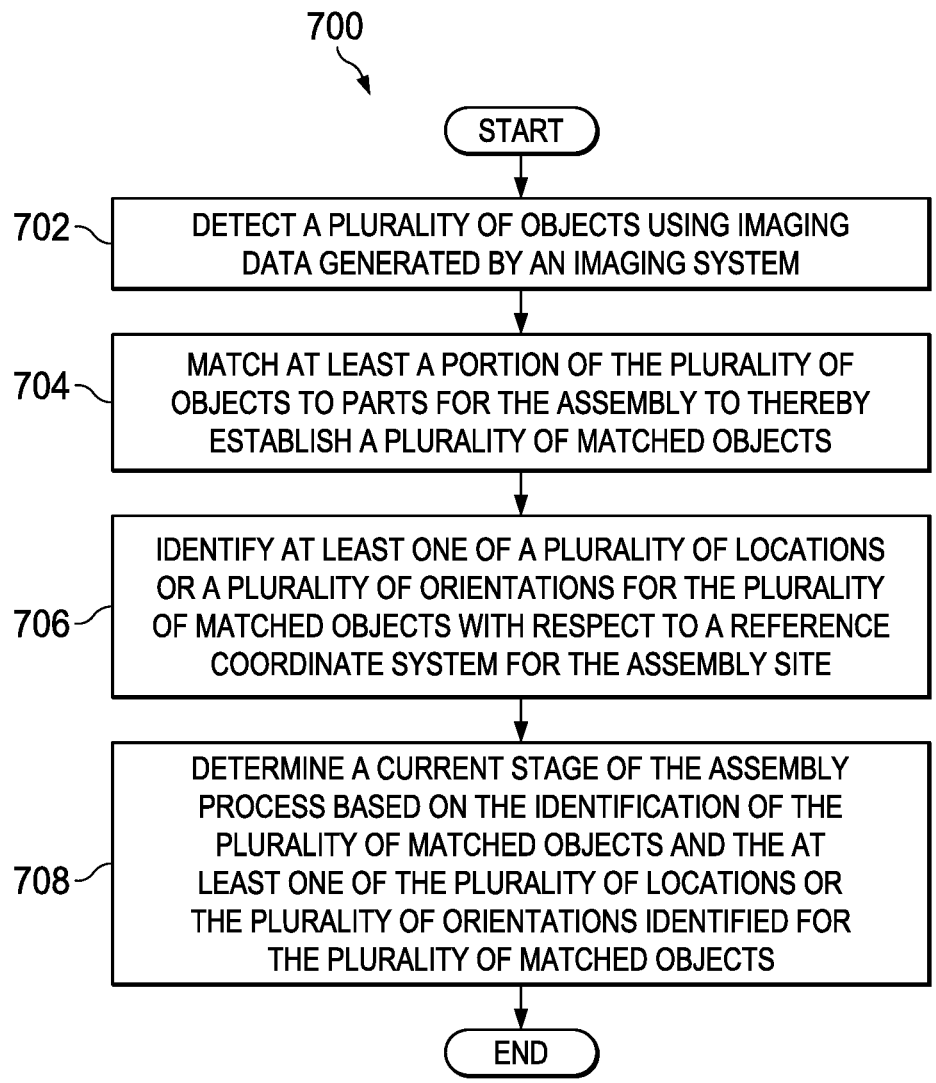
FIG. 7 is a flowchart of a process for identifying a current stage of an assembly process in accordance with an example embodiment.

FIG. 7 is a flowchart of a process for identifying a current stage of an assembly process in accordance with an example embodiment. Process 700 illustrated in FIG. 7 may be performed using supervision and inspection system 112 described in FIGS. 1-3. More particularly, process 700 may be performed using assembly manager 118 described in FIGS. 1 and 3.

Process 700 begins by detecting a plurality of objects using imaging data generated by an imaging system (operation 702). The imaging system may include one or more cameras positioned relative to an assembly site and an assembly at the assembly site.

Next, at least a portion of the plurality of objects is matched to parts for the assembly to thereby establish a plurality of matched objects (operation 704). Operation 704 may be performed using at least one of images of the parts or models of the parts. For example, operation 704 may be performed using part images library 202 and part models library 204 in FIG. 2. In operation 704, each object is compared to known parts for the assembly and is either matched to a known part or flagged as unmatched. In these illustrative examples, matching at least a portion of the plurality of objects to known parts for the assembly may be performed using at least one of machine learning, deep learning, computer vision, a customized learning technique, computational learning, or artificial intelligence learning.

Thereafter, at least one of a plurality of locations or a plurality of orientations is identified for the plurality of matched objects with respect to a reference coordinate system for the assembly site (operation 706). For example, for each object matched to a known part for the assembly being built, a location, an orientation, or both relative to a reference coordinate system for the assembly site is computed. In some illustrative examples, the reference coordinate system may be with respect to the assembly itself. The locations of the matched objects may be identified by using the known positions of the cameras relative to the assembly site and thus, the known positions of the cameras with respect a model (e.g., CAD model) of the assembly or the assembly site).

The current stage of the assembly process is determined based on the identification of the plurality of matched objects and the at least one of the plurality of locations or the plurality of orientations identified for the plurality of matched objects (operation 708), with the process terminating thereafter. Operation 708 may be performed by comparing the locations, orientations, or both of the matched objects to models of the assembly at various stages during the assembly process, models of the assembly site at various stages during the assembly process, or both. Assembly process flow data 206, assembly site model data 208, assembly model data 210, assembly video data 212, or a combination thereof, from FIG. 2, may be used to determine the current stage of the assembly process.

Figure 8:
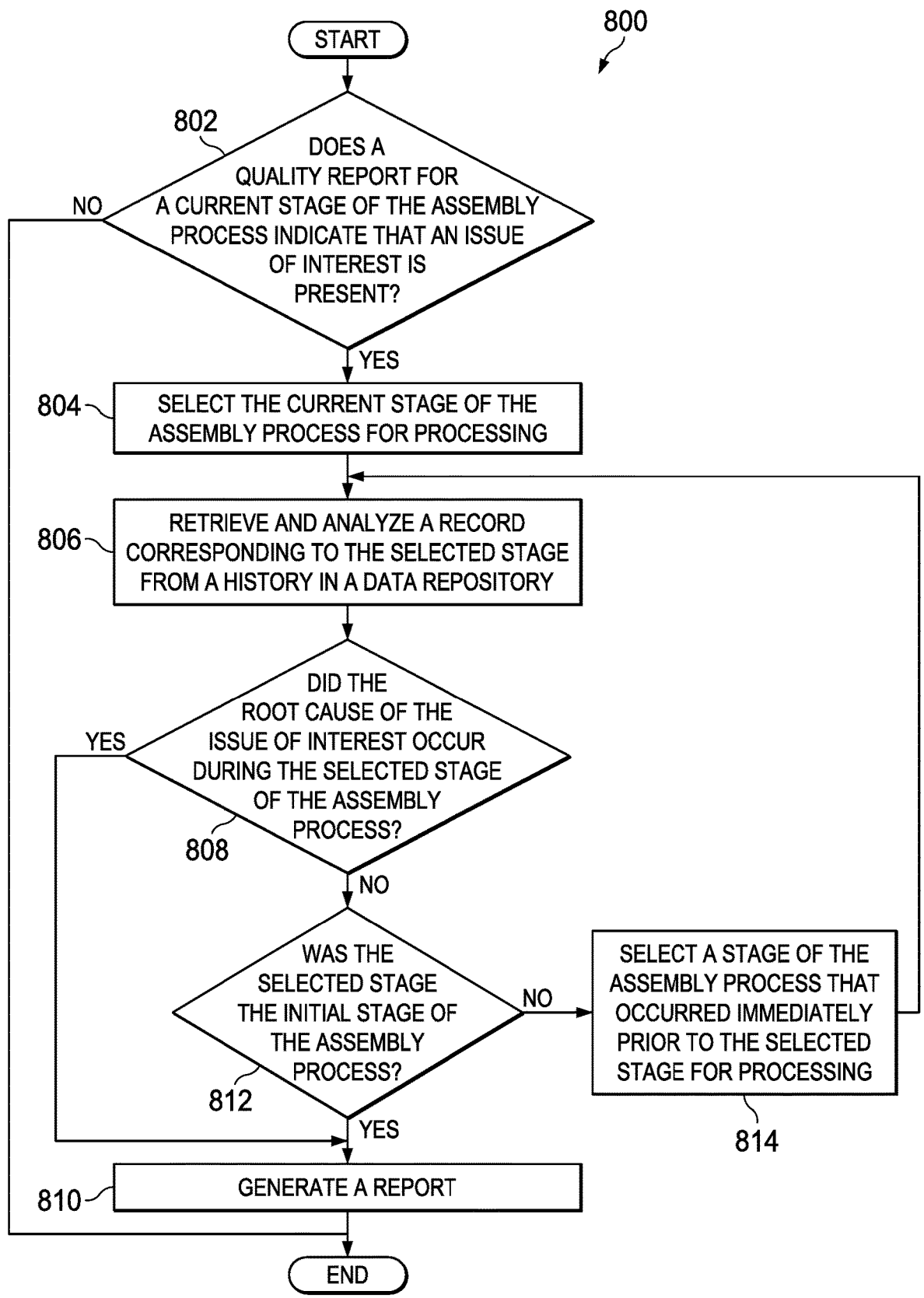
FIG. 8 is a flowchart of a process for performing a rollback verification in accordance with an example embodiment.

FIG. 8 is a flowchart of a process for performing a rollback verification in accordance with an example embodiment. Process 800 illustrated in FIG. 8 may be performed using supervision and inspection system 112 described in FIGS. 1-3. More particularly, process 800 may be performed using rollback verifier 120 described in FIG. 1.

Process 800 may begin by determining whether a quality report for a current stage of the assembly process indicates that an issue of interest is present (operation 802). The issue of interest may be one of an improper part, an improper part location, an improper orientation, a crack, a dent, a twist, a surface inconsistency, or some other type of issue of interest. An improper part means that the wrong part has been added to the assembly. An improper part location may mean that a correct part has been assembled or added to the assembly at the wrong location. An improper orientation may mean that a correct part has the wrong orientation relative to the assembly.

If an issue of interest is not present, the process terminates. Otherwise, if an issue of interest is present, the current stage of the assembly process is selected for processing (operation 804). A record corresponding to the selected stage is retrieved from a history in a data repository and analyzed (operation 806).

Thereafter, a determination is made as to whether the root cause of the issue of interest occurred during the selected stage of the assembly process (operation 808). If the root cause occurred during the selected stage of the assembly process, a report is generated (operation 810), with the process terminating thereafter. The report may be an alert or a notice of information regarding the issue of interest. In some cases, the report includes images, video, or both to better inform a human operator about the issue.

If, however, the root cause did not occur during the selected stage of the assembly process, a determination is made as to whether the selected stage was the initial stage of the assembly process (operation 812). If the selected stage was the initial stage of the assembly process, the process proceeds to operation 810 described above. Here, the report may take the form of a notification, an alert, or a substantive report indicating that the root cause could not be identified.

If the selected stage was not the initial stage of the assembly process, then a stage of the assembly process that occurred immediately prior to the selected stage is selected for processing (operation 814), with the process then returning to operation 806 as described above. In this manner, process 800 rolls back through the history of records stored in the data repository in an efficient manner. Information about prior assembly steps may be analyzed and evaluated without requiring human intervention or requiring extensive disassembly (e.g., a reversal of the assembly steps already performed).

Accordingly, this type of rollback verification allows automated inspection and quality control of the assembly process in a manner that may be too difficult or time-consuming for a human operator to perform. A human operator might have to reverse the assembly process and disassemble a portion of the assembly in order to identify a root case of an issue. However, the rollback verification process described above is an automated method for identifying the root cause of an issue that occurred prior to the current stage of assembly easily, quickly, and efficiently.

Figure 9:
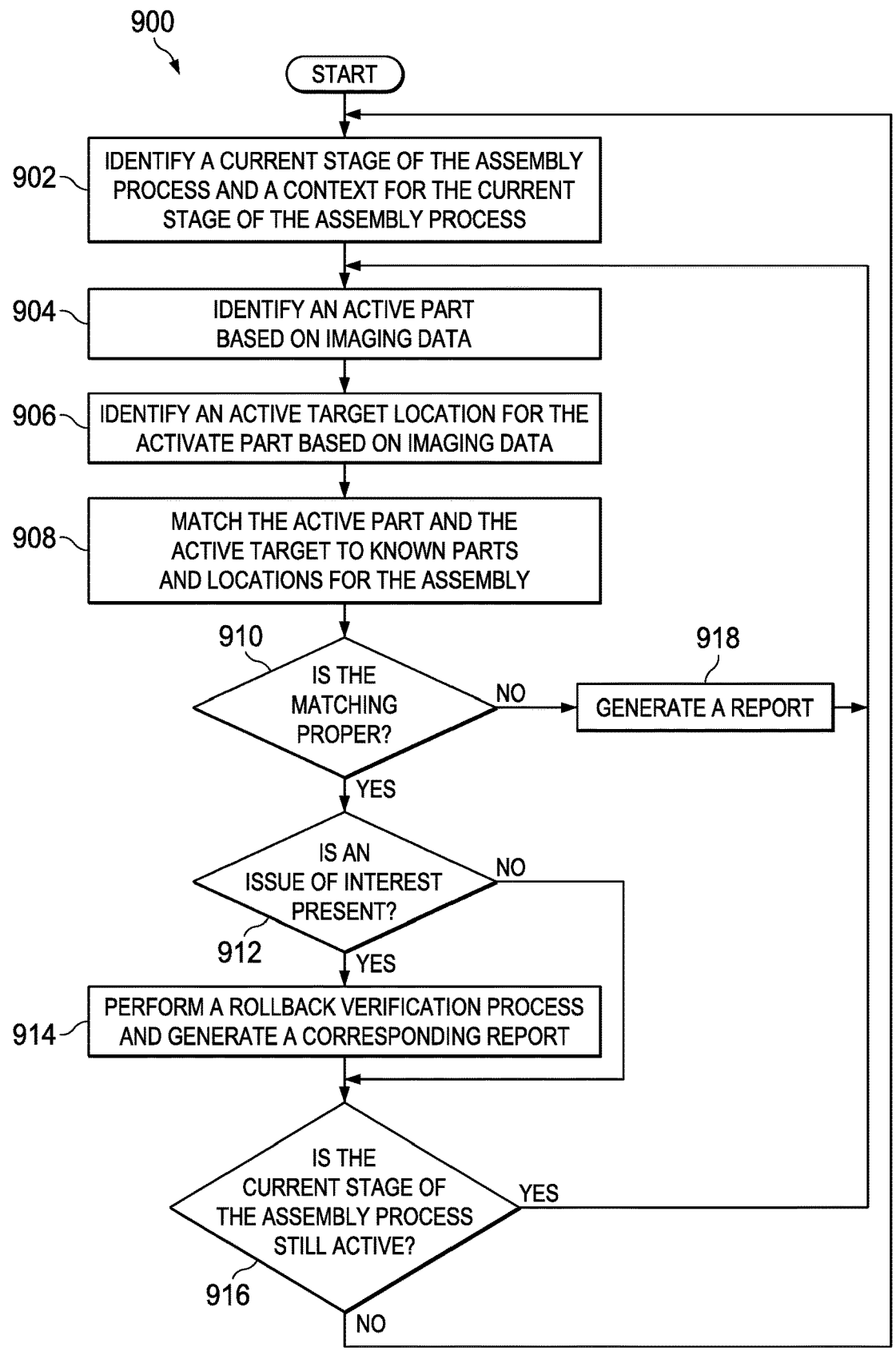
FIG. 9 is a flowchart of a process for automated supervision and inspection of an assembly process in accordance with an example embodiment.

FIG. 9 is a flowchart of a process for automated supervision and inspection of an assembly process in accordance with an example embodiment. Process 900 illustrated in FIG. 9 may be performed using supervision and inspection system 112 described in FIGS. 1-3.

Process 900 may begin by identifying a current stage of the assembly process and a context for the current stage of the assembly process (operation 902). Next, an active part is identified based on imaging data (operation 904). The imaging data may be generated by one or more cameras in fixed positions relative to an assembly site. The active part may be, for example, the part being held by a human operator or a robot for installation. The identification performed in operation 904 may be performed using machine learning, computer vision, or other types of learning techniques.

Thereafter, an active target location is identified for the active part based on imaging data (operation 906). The active target location may be identified using machine learning, computer vision, or other types of learning techniques and 3D models of the assembly site or the assembly to be built. In some illustrative examples, the target location may be identified through proximity-based detections combined with active-assembly detections once the operator begins the task of installing the part.

Next, the active part and the active target location are matched to known parts for the assembly (operation 908). A determination is made as to whether this matching is proper (operation 910). The match may be considered proper when the combination of the active part and the active target location are correct for the current stage of the assembly process.

If the match is proper, imaging data is used to determine whether an issue of interest is present (operation 912). This determination may be made based on machine learning, computer vision, or other types of learning algorithms. In operation 912, the determination is made based on known types of issues and predefined quality metrics.

If an issue is present, a rollback verification process is performed to identify the root cause of the issue and a corresponding report is generated (operation 914). The process then determines whether the current stage of the assembly process is still active (operation 916). The current stage is considered still active if there are additional steps or tasks to be performed as part of this stage of the assembly process. If the current stage is still active, the process returns to operation 904 described above. Otherwise, the process returns to operation 902 described above.

With reference again to operation 912, if no issue of interest is present, the process proceeds to operation 916. With reference again to operation 910, if the match is not proper, a report is generated (operation 918), with the process then proceeding to operation 904 as described above. This allows the human operator or robot to select either a new active part or a new active target location.

By returning to operation 902 after operation 918, the process may "advance" the active stage of the assembly process and use a new context for decision-making. When there is no next stage to advance to, the assembly process is complete. Thus, the process iterates until the assembly process has been completed.

Figure 10:
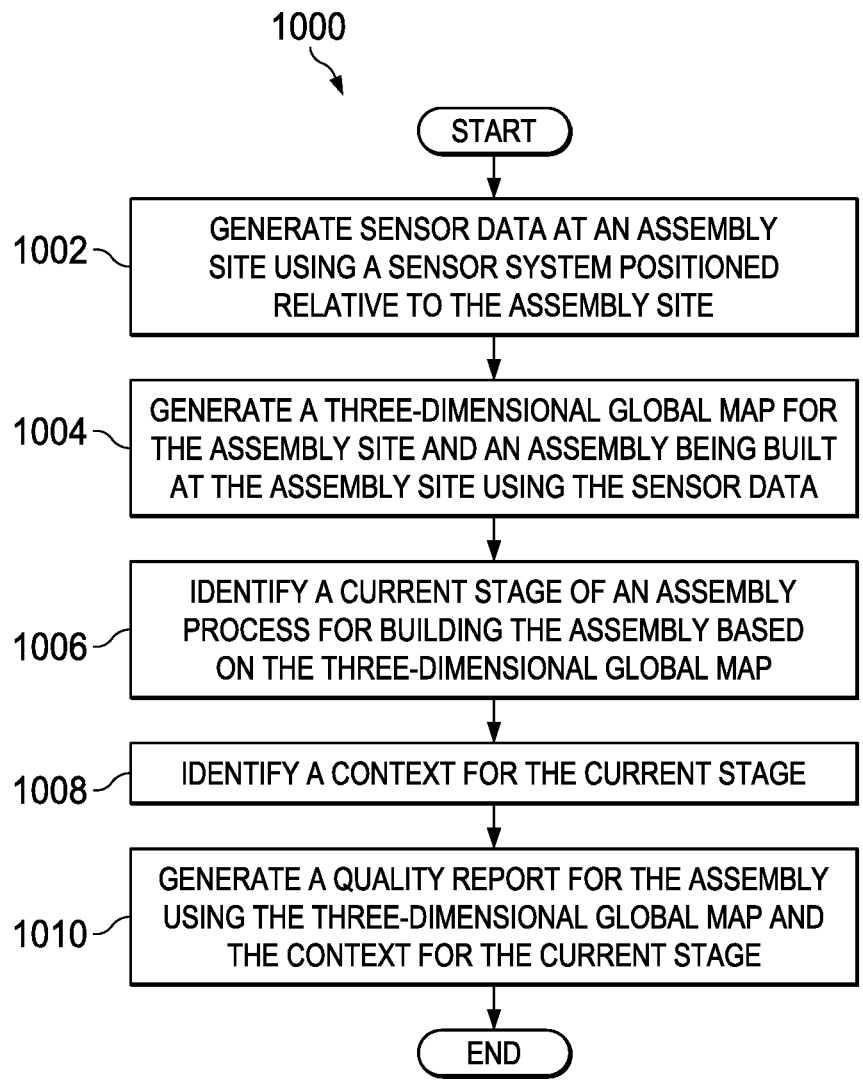
FIG. 10 is a flowchart of a process for performing automated supervision and inspection of an assembly process in accordance with an example embodiment.

FIG. 10 is a flowchart of a process for performing automated supervision and inspection of an assembly process in accordance with an example embodiment. Process 1000 illustrated in FIG. 10 may be performed using supervision and inspection system 112 described in FIGS. 1-3. Process 1000 may be used to automate the supervision and inspection of assembly process 106.

Process 1000 may begin by generating sensor data at an assembly site using a sensor system positioned relative to the assembly site (operation 1002). A three-dimensional global map for the assembly site and an assembly being built at the assembly site is generated using the sensor data (operation 1004).

Thereafter, a current stage of an assembly process for building the assembly is identified based on the three-dimensional global map (operation 1006). A context is then identified for the current stage (operation 1008). A quality report for the assembly may then be generated using the three-dimensional global map and the context for the current stage (operation 1010), with the process terminating thereafter. Process 1000 may be repeated at various stages or each stage of the assembly process.

Figure 11:
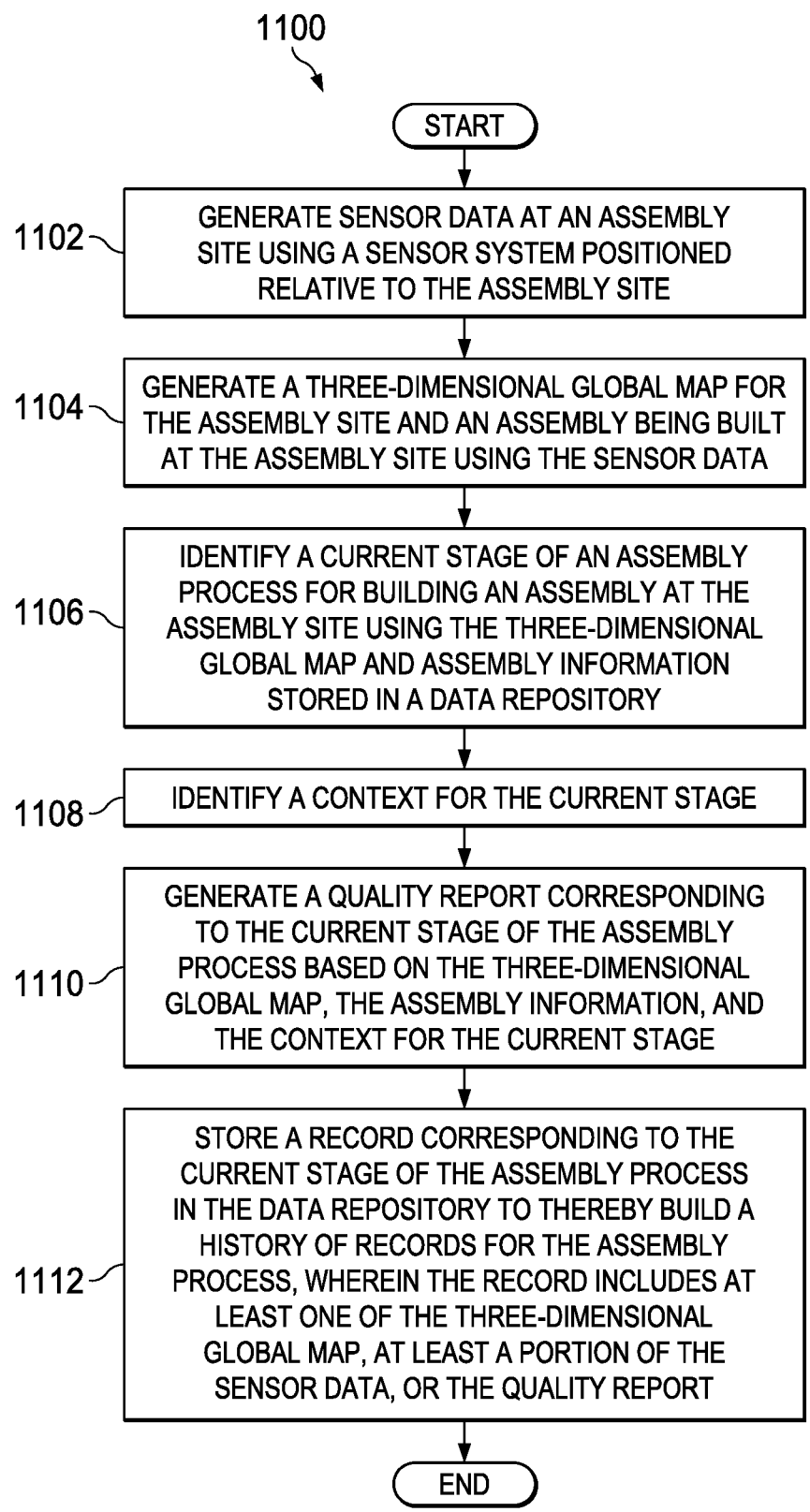
FIG. 11 is a flowchart of a process for performing automated supervision and inspection of an assembly process in accordance with an example embodiment.

FIG. 11 is a flowchart of a process for performing automated supervision and inspection of an assembly process in accordance with an example embodiment. Process 1100 illustrated in FIG. 11 may be performed using supervision and inspection system 112 described in FIGS. 1-3.

Process 1100 may be used to automate the supervision and inspection of assembly process 106 at assembly site 105 in FIG. 1.

Process 1100 begins by generating sensor data at an assembly site using a sensor system positioned relative to the assembly site (operation 1102). In these illustrative examples, the sensor system includes multiple cameras that are placed in predetermined, fixed positions relative to the assembly being built at the assembly site. These positions are selected to provide images that provide the most information and optimal angles for evaluating the assembly process. The cameras may generate images, video, or both.

Next, a three-dimensional global map for the assembly site and an assembly being built at the assembly site is generated using the sensor data (operation 1104). Operation 1104 may be performed in a number of different ways. As one illustrative example, the sensor data may include point cloud data. This point cloud data may be either used in raw form or processed to form a three-dimensional point cloud for the assembly site. One or more processing algorithms (e.g., edge detection, segmentation, mapping, etc.) may be used to process the point cloud data and generate a three-dimensional point cloud for use in generating the three-dimensional global map.

A current stage of the assembly process for building an assembly at the assembly site is then identified using the three-dimensional global map and assembly information stored in a data repository (operation 1106). Operation 1106 may be performed by, for example, detecting objects and site elements in the three-dimensional global map.

Thereafter, a context is identified for the current stage (operation 1108). A quality report corresponding to the current stage of the assembly process is generated based on the three-dimensional global map, the assembly information, and the context for the current stage (operation 1110). A record corresponding to the current stage of the assembly process is stored in the data repository to thereby build a history of records for the assembly process (operation 1112), with the process terminating thereafter. The record may include at least a portion of the sensor data, the three-dimensional global map, the quality report, or a combination thereof.

Although process 1100 is described as using a three-dimensional global map to identify the current stage of the assembly, other techniques may also be used. In some illustrative examples, operation 1104 may be optionally omitted and the current stage of the assembly may be identified by processing the three-dimensional point cloud described above. The three-dimensional point cloud may be processed using any number or combination of algorithms or techniques to detect objects and site elements. For example, edge detection, segmenting, mapping, feature extraction, other such techniques, or a combination thereof may be used to process the three-dimensional point cloud. The information generated by these techniques may then be compared to expected or optimal information corresponding to the same current stage of assembly, as defined by the context for the current stage. The results of this comparison may be part of the quality report generated in operation 1110.

Figure 12:
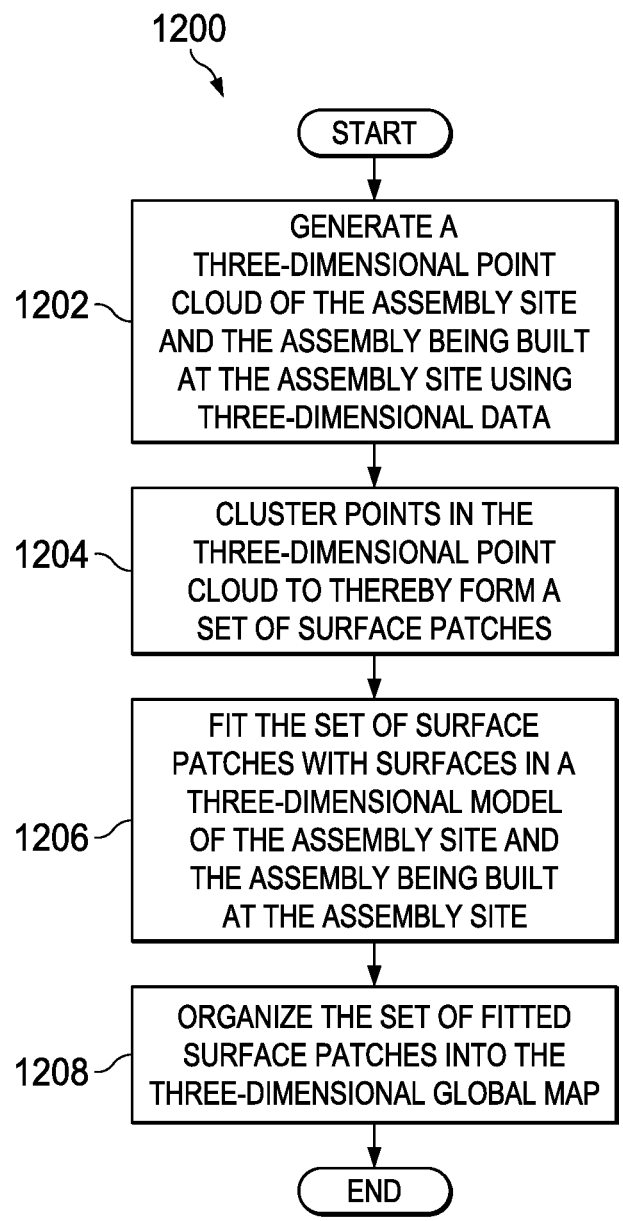
FIG. 12 is a flowchart of a process for generating a three-dimensional global map of an assembly site and an assembly in accordance with an example embodiment.

FIG. 12 is a flowchart of a process for generating a three-dimensional global map of an assembly site and an assembly in accordance with an example embodiment. Process 1200 illustrated in FIG. 12 may be performed using supervision and inspection system 112 described in FIGS. 1-3. More specifically, process 1200 may be performed using data analyzer 302 described in FIG. 3. Further, process 1200 is an example of one implementation for operation 1004 in FIG. 10 and operation 1104 in FIG. 11.

Process 1200 may begin by generating a three-dimensional point cloud of the assembly site and the assembly being built at the assembly site using three-dimensional data (operation 1202). The three-dimensional data may be generated by, for example, at least one of a light detection and ranging sensor, a radar sensor, a sonar sensor, or a stereo camera positioned relative to the assembly site and the assembly at the assembly site. Further, the three-dimensional data may be generated in substantially real-time and may be generated continuously or periodically. The three-dimensional data may be, for example, three-dimensional data 305 described in FIG. 3. Operation 1202 may include fusing the data from multiple sensors to generate the three-dimensional point cloud. The three-dimensional cloud may be, for example, three-dimensional point cloud 317 in FIG. 3.

Next, points in the three-dimensional point cloud are clustered to thereby form a set of surface patches (operation 1204). Operation 1204 may be performed using, for example, at least one of a clustering algorithm or a surface reconstruction algorithm. Each surface patch is formed by a localized cluster of points in the three-dimensional cloud. In one illustrative example, operation 1204 is performed by clustering the points in the three-dimensional point cloud and then converting these clusters into three-dimensional surfaces. A surface patch may include one or more of these three-dimensional surfaces.

Thereafter, the set of surface patches is fitted with surfaces in a three-dimensional model of the assembly site and the assembly being built at the assembly site (operation 1206). In operation 1206, the three-dimensional model may include one or more CAD models. In some illustrative examples, operation 1206 may be performed by determining which surfaces in the three-dimensional model are most closely matched by the surface patches. The fitting in operation 1206 may be performed using at least one of radial basis functions, spline approximations, or mesh interpolations.

In operation 1206, fitting a surface patch to a surface of a three-dimensional model may include modifying or updating the surface of the three-dimensional model based on the surface patch or the corresponding points of the three-dimensional point cloud used to form the surface patch, to thereby form a fitted surface patch. In other illustrative examples, the fitting may include modifying or updating the surface patch based on the three-dimensional model to thereby form a fitted surface patch. In some cases, this fitting includes identifying a position (location and orientation) for the surface patch with respect to a reference coordinate system for the three-dimensional model.

The set of fitted surface patches is then organized into the three-dimensional global map (operation 1208), with the process terminating thereafter. In one illustrative example, operation 1208 may be performed by, for example, overlaying surface patches over their corresponding surfaces in the three-dimensional model to form the three-dimensional global map. In other illustrative examples, the surface patches may be aligned with respect to the reference coordinate system for the three-dimensional model to form the three-dimensional global map.

The three-dimensional global map generated in operation 1208 may be used to identify the current stage of the assembly process and to generate assessments about the quality of the assembly process and the assembly being built at the assembly site via the assembly process. In these example embodiments, features, such as features 314 in FIG. 3, may be identified using three-dimensional global map. Using three-dimensional global map may allow different features, additional features, or both to be identified. For example, some features that may be more difficult to detect through the processing of two-dimensional imaging data may be easier or more readily detectable through the processing of three-dimensional data.

Figure 13:
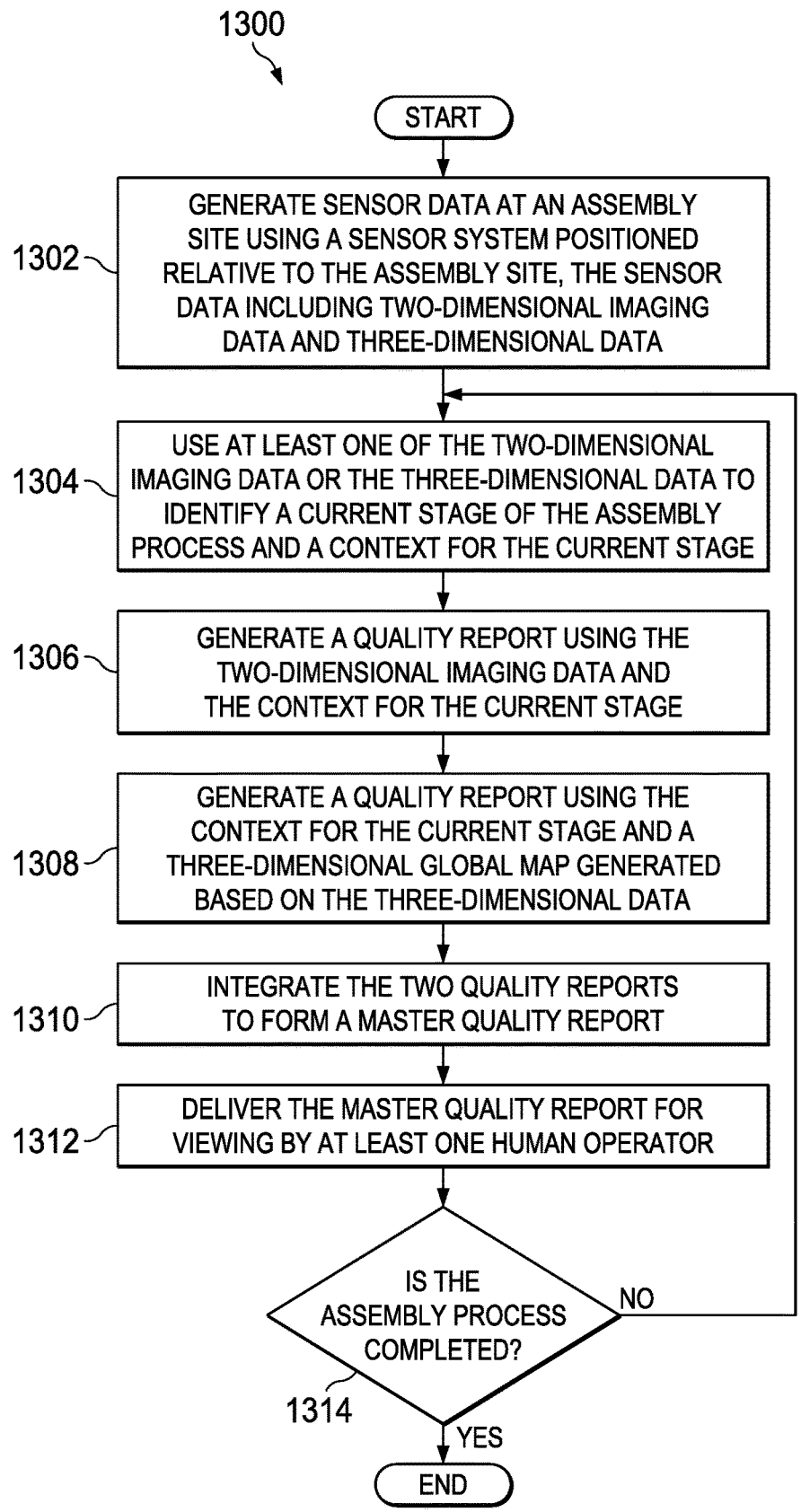
FIG. 13 is a flowchart of a process for performing automated supervision and inspection of an assembly process in accordance with an example embodiment.

FIG. 13 is a flowchart of a process for performing automated supervision and inspection of an assembly process in accordance with an example embodiment. Process 1300 may be used to automate the supervision and inspection of assembly process 106.

Process 1300 may begin by generating sensor data at an assembly site using a sensor system positioned relative to the assembly site, the sensor data including two-dimensional imaging data and three-dimensional data (operation 1302). The sensor system may include any number of or combination of sensors positioned relative to the assembly site. The sensors may continuously or periodically generate the sensor data.

For example, the sensor system may include one or more stationary platforms at fixed positions around the assembly site, within the assembly site, or both for generating the two-dimensional imaging data. These stationary platforms may be outfitted with cameras, which, in some cases, may be rotating cameras. The sensor system may also include one or more sensor devices capable of generating three-dimensional data. For example, the sensor system may include at least one of a LiDAR sensor, a radar sensor, a sonar sensor, or a stereo camera.

At least one of the two-dimensional imaging data or the three-dimensional data is used to identify a current stage of the assembly process and a context for the current stage (operation 1304). Thereafter, a quality report is generated using the two-dimensional imaging data and the context for the current stage (operation 1306). A quality report is generated using the context for the current stage and a three-dimensional global map generated based on the three-dimensional data (operation 1308).

The two quality reports are then integrated to form a master quality report (operation 1310). In one illustrative example, operation 1310 may be performed by comparing the two quality reports. The various assessments included in each quality report may be fused. For example, the inconsistency assessments in both quality reports may be fused to remove redundant detections of undesired features and consolidate detections as a single detection where appropriate.

The master quality report is delivered for viewing by at least one human operator (operation 1312). Operation 1312 may be performed in various ways. As one example, a report detailing the results of the evaluation of the current stage of the assembly process may be delivered in a filed. In other examples, information in the master quality report may be displayed in a graphical user interface on a display system in a manner that visually conveys the results of the evaluation. For example, graphical indicators overlaid on a three-dimensional model of the assembly at the assembly site may be used to indicate issues of interest. For example, colored circles, arrows, or other types of graphical indicators may be used to indicate parts that are wrong, parts that have been assembled in the wrong location, dents, cracks, twists, surface inconsistencies, other types of issues, or a combination thereof.

In one illustrative example, the master quality report may be sent to at least one remote device over at least one communications link for viewing by at least one human operator. For example, operations 1304 through 1310 may be performed on a remote server located outside of the manufacturing environment. Once the master quality report has been generated, the master quality report may be sent to a device located at the assembly site (e.g., mobile device such as a laptop, tablet, smartphone, etc.) so that a human operator at the assembly site may use the information in the master quality report to resolve any issues of interest. In other illustrative examples, operation 1310 is omitted such that operation 1312 is modified so that both quality reports are delivered to the human operator(s) for viewing.

A determination is made as to whether the assembly process is completed (operation 1314). If the assembly process is not complete, the process returns to operation 1304 described above. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
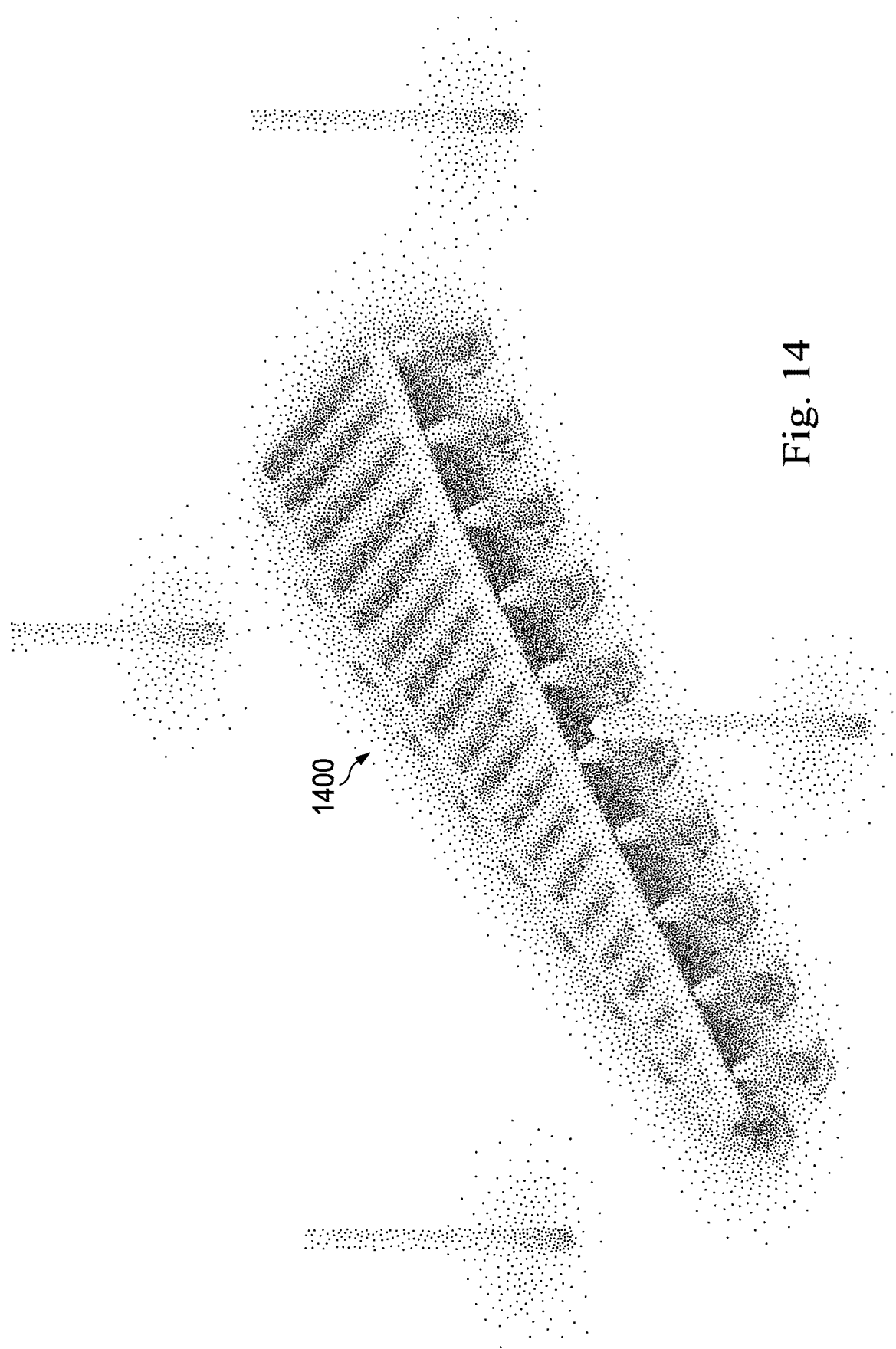
FIG. 14 is an illustration of a three-dimensional point cloud in accordance with an illustrative embodiment.

FIG. 14 is an illustration of a three-dimensional point cloud in accordance with an illustrative embodiment. Three-dimensional point cloud 1400 is an example of one implementation for three-dimensional point cloud 317 in FIG. 3. Further, three-dimensional point cloud 1400 may be an example of the three-dimensional point cloud generated in operation 1202 of FIG. 12. Three-dimensional point cloud 1400 is created using the data form multiple LiDAR sensors.

Figure 15:
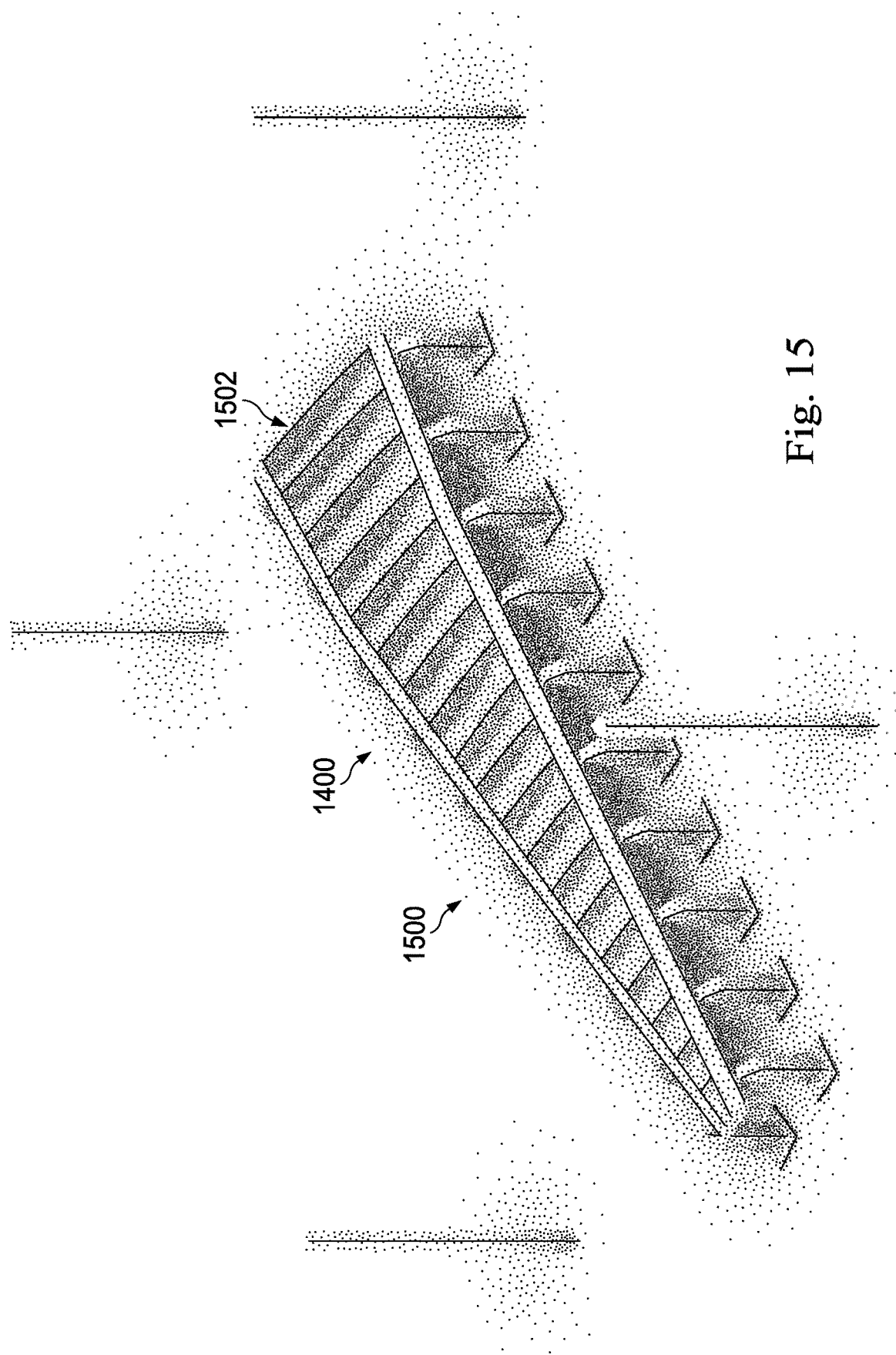
FIG. 15 is an illustration of points in the three-dimensional point cloud from FIG. 14 with points clustered in accordance with an illustrative embodiment.

FIG. 15 is an illustration of points in three-dimensional point cloud 1400 from FIG. 14 with points clustered in accordance with an illustrative embodiment. Points 1500 three-dimensional point cloud 1400 have been clustered into clusters 1502. Clusters 1502 of points 1500 may represent the type of clustering that may be performed in operation 1204 in FIG. 1.

Figure 16:
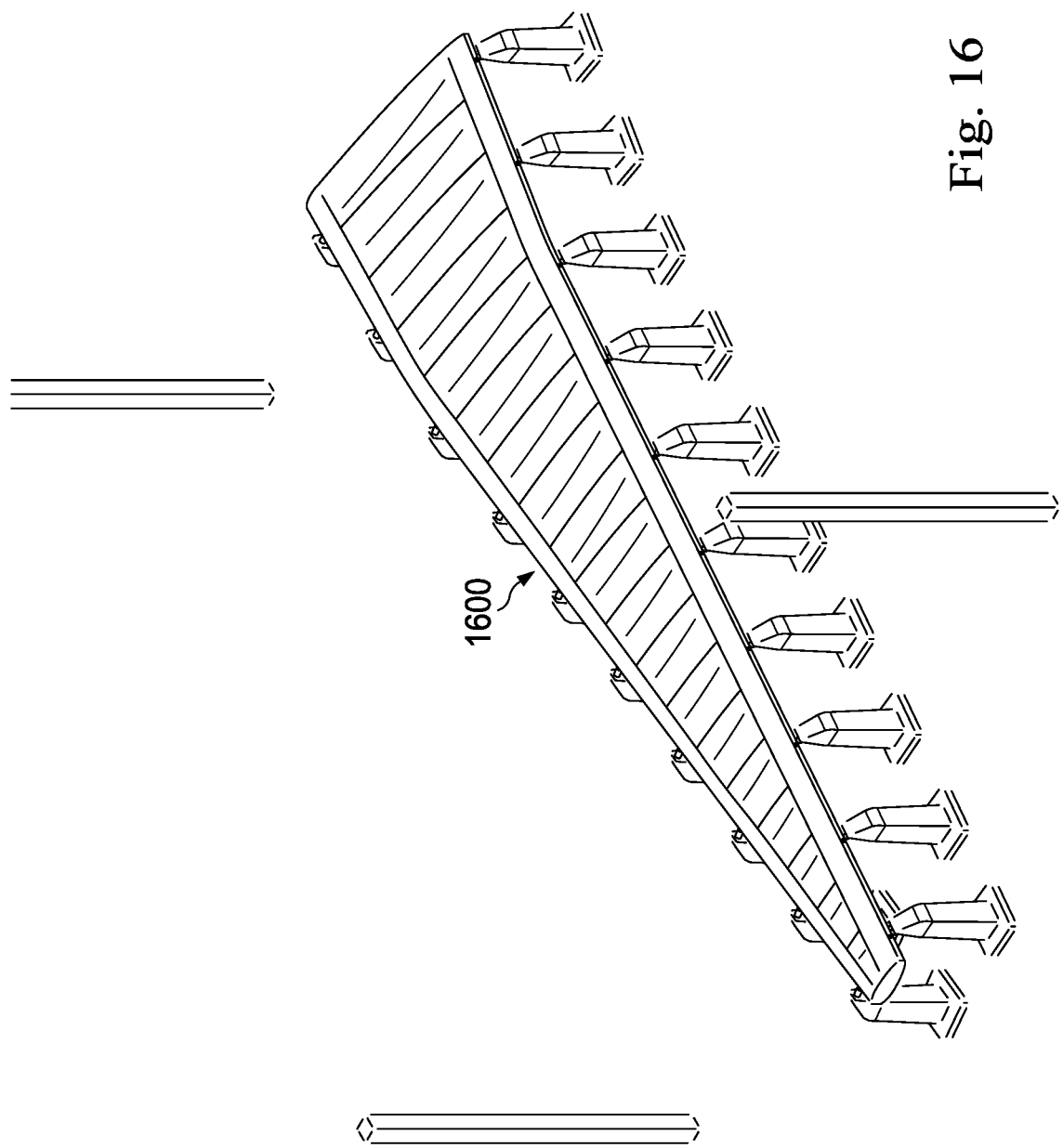
FIG. 16 is an illustration of surface patches formed using the clusters from FIG. 15 in accordance with an illustrative embodiment.

FIG. 16 is an illustration of surface patches formed using clusters 1502 from FIG. 15 in accordance with an illustrative embodiment. Surface patches 1600 may be examples of the type of surfaces patches that may be formed in operation 1204 in FIG. 1.

Figure 17:
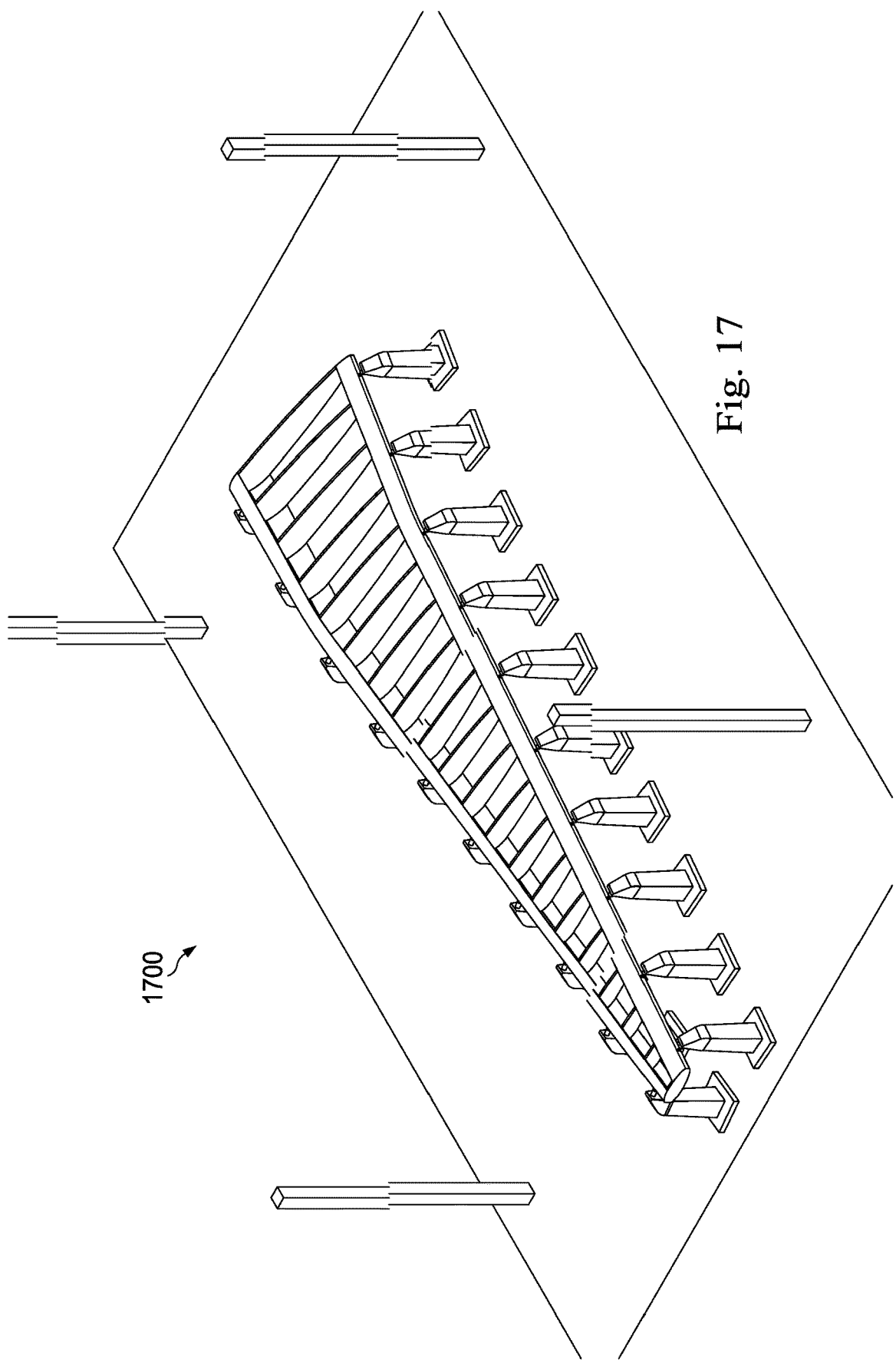
FIG. 17 is an illustration of a three-dimensional global map in accordance with an illustrative embodiment.
Figure 18:
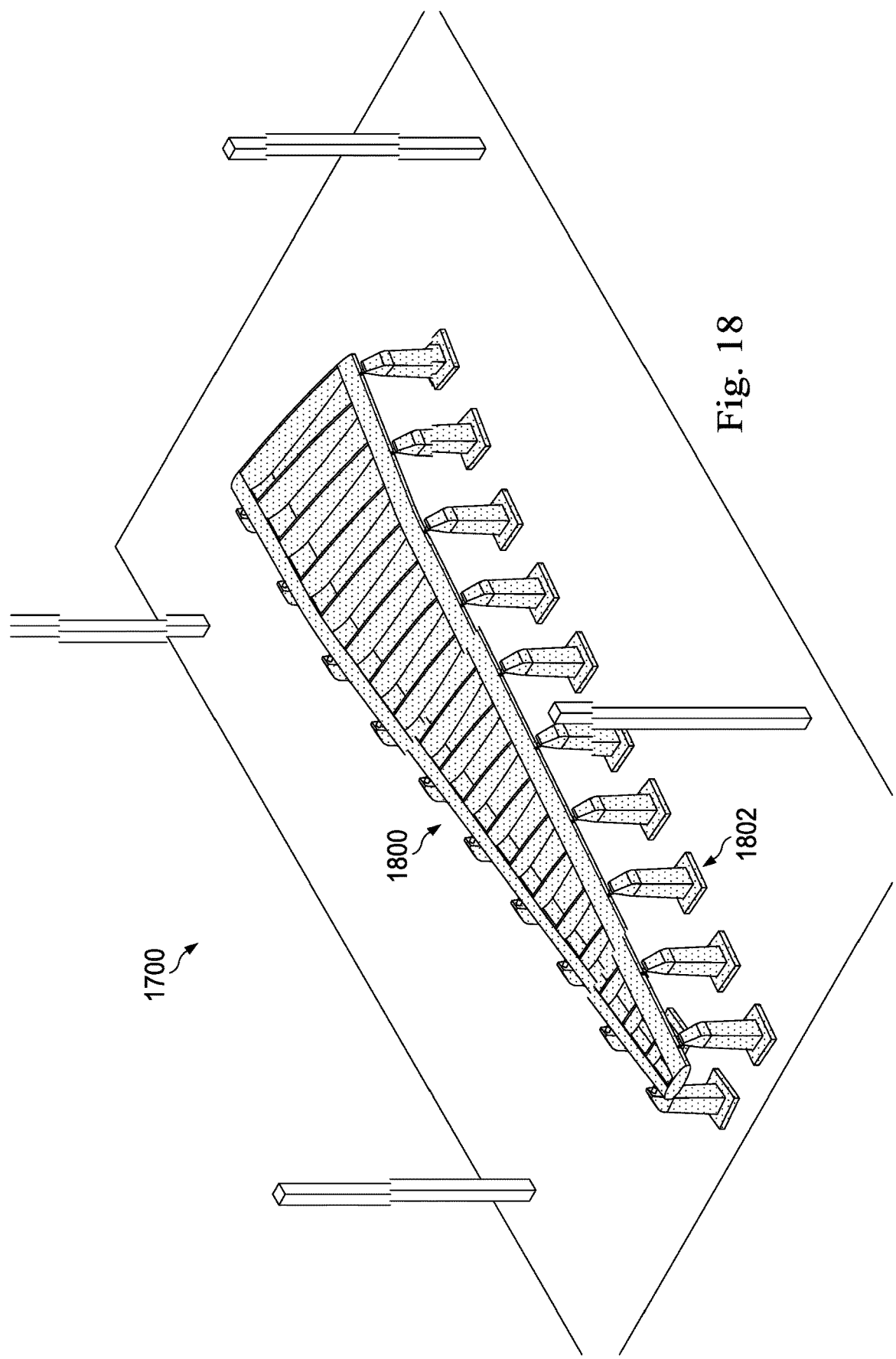
FIG. 18 is an illustration of objects and site elements that have been detected in a three-dimensional global map in accordance with an illustrative embodiment.

FIG. 17 is an illustration of a three-dimensional global map in accordance with an illustrative embodiment. Three-dimensional global map 1700 is an example of one implementation for three-dimensional global map 319 in FIG. 3. Further, three-dimensional global map 1700 may be an example of the three-dimensional global map 1700 generated in operation 1208 in FIG. 12. Surface patches 1600 in FIG. 16 are fitted to a three-dimensional model (e.g., CAD model) to form three-dimensional global map 1700, FIG. 18 is an illustration of objects and site elements that have been detected in a three-dimensional global map in accordance with an illustrative embodiment. Objects 1800 and site elements 1802 have been detected within three-dimensional global map 1700.

Figure 19:
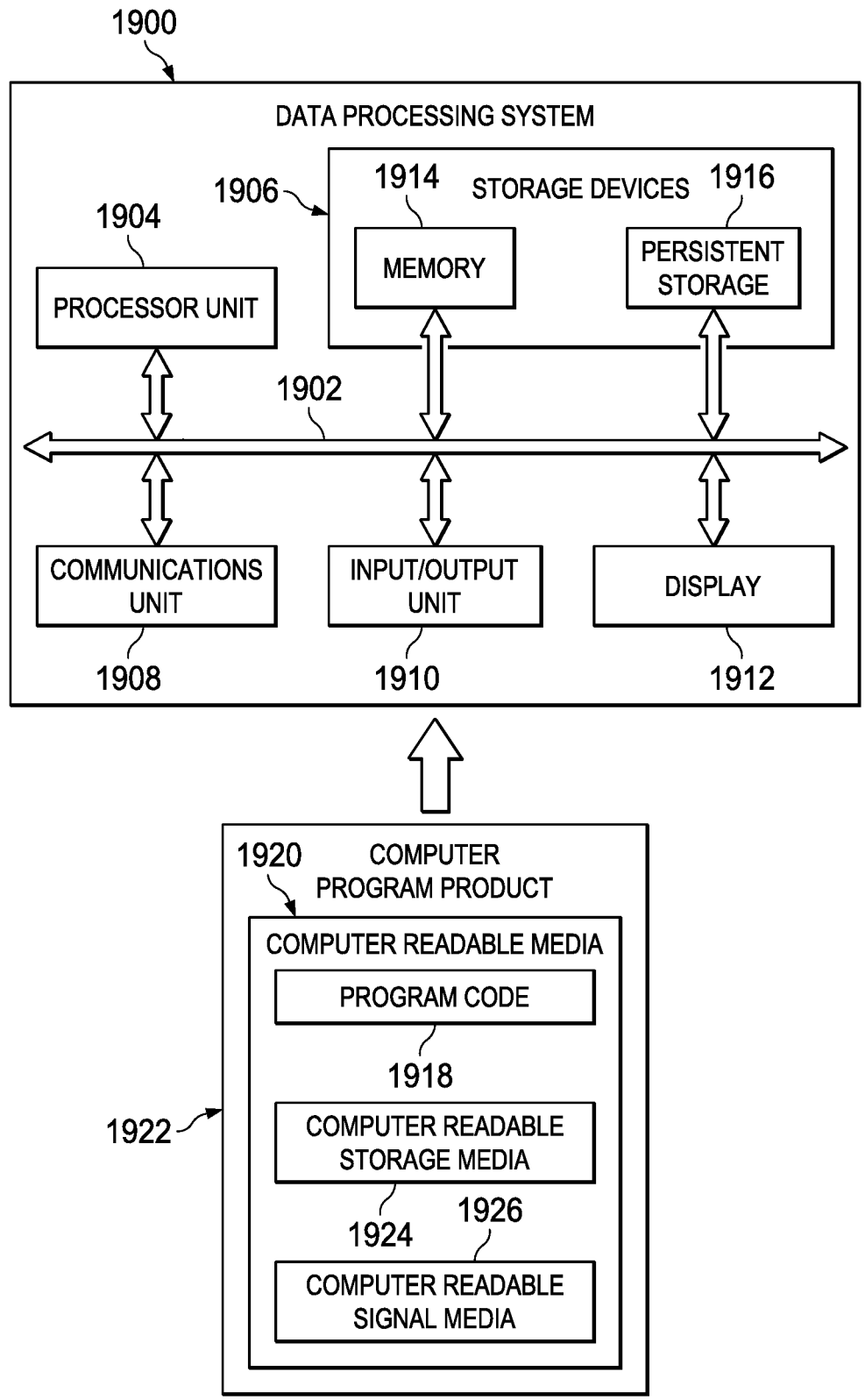
FIG. 19 is a block diagram of a data processing system in accordance with an example embodiment.

Turning now to FIG. 19, an illustration of a data processing system in the form of a block diagram is depicted in accordance with an illustrative embodiment. Data processing system 1900 may be used to implement computer system 124 in FIG. 1. As depicted, data processing system 1900 includes communications framework 1902, which provides communications between processor unit 1904, storage devices 1906, communications unit 1908, input/output unit 1910, and display 1912. In some cases, communications framework 1902 may be implemented as a bus system.

Processor unit 1904 is configured to execute instructions for software to perform a number of operations. Processor unit 1904 may comprise a number of processors, a multi-processor core, and/or some other type of processor, depending on the implementation. In some cases, processor unit 1904 may take the form of a hardware unit, such as a circuit system, an application specific integrated circuit (ASIC), a programmable logic device, or some other suitable type of hardware unit.

Instructions for the operating system, applications, and/or programs run by processor unit 1904 may be located in storage devices 1906. Storage devices 1906 may be in communication with processor unit 1904 through communications framework 1902. As used herein, a storage device, also referred to as a computer readable storage device, is any piece of hardware capable of storing information on a temporary and/or permanent basis. This information may include, but is not limited to, data, program code, and/or other information.

Memory 1914 and persistent storage 1916 are examples of storage devices 1906. Memory 1914 may take the form of, for example, a random access memory or some type of volatile or non-volatile storage device. Persistent storage 1916 may comprise any number of components or devices. For example, persistent storage 1916 may comprise a hard drive, a flash memory, a rewritable optical disk, a rewritable magnetic tape, or some combination of the above. The media used by persistent storage 1916 may or may not be removable.

Communications unit 1908 allows data processing system 1900 to communicate with other data processing systems and/or devices. Communications unit 1908 may provide communications using physical and/or wireless communications links.

Input/output unit 1910 allows input to be received from and output to be sent to other devices connected to data processing system 1900. For example, input/output unit 1910 may allow user input to be received through a keyboard, a mouse, and/or some other type of input device. As another example, input/output unit 1910 may allow output to be sent to a printer connected to data processing system 1900.

Display 1912 is configured to display information to a user. Display 1912 may comprise, for example, without limitation, a monitor, a touch screen, a laser display, a holographic display, a virtual display device, and/or some other type of display device.

In this illustrative example, the processes of the different illustrative embodiments may be performed by processor unit 1904 using computer-implemented instructions. These instructions may be referred to as program code, computer usable program code, or computer readable program code and may be read and executed by one or more processors in processor unit 1904.

In these examples, program code 1918 is located in a functional form on computer readable media 1920, which is selectively removable, and may be loaded onto or transferred to data processing system 1900 for execution by processor unit 1904. Program code 1918 and computer readable media 1920 together form computer program product 1922. In this illustrative example, computer readable media 1920 may be computer readable storage media 1924 or computer readable signal media 1926.

Computer readable storage media 1924 is a physical or tangible storage device used to store program code 1918 rather than a medium that propagates or transmits program code 1918. Computer readable storage media 1924 may be, for example, without limitation, an optical or magnetic disk or a persistent storage device that is connected to data processing system 1900.

Alternatively, program code 1918 may be transferred to data processing system 1900 using computer readable signal media 1926. Computer readable signal media 1926 may be, for example, a propagated data signal containing program code 1918. This data signal may be an electromagnetic signal, an optical signal, and/or some other type of signal that can be transmitted over physical and/or wireless communications links.

The illustration of data processing system 1900 in FIG. 19 is not meant to provide architectural limitations to the manner in which the illustrative embodiments may be implemented. The different illustrative embodiments may be implemented in a data processing system that includes components in addition to or in place of those illustrated for data processing system 1900. Further, components shown in FIG. 19 may be varied from the illustrative examples shown.

Figure 20:
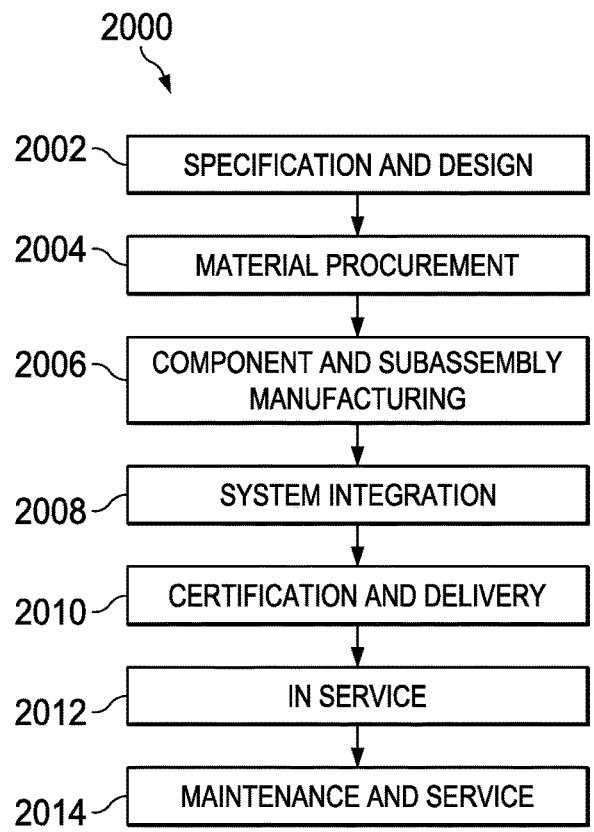
FIG. 20 is an illustration of an aircraft manufacturing and service method in accordance with an illustrative embodiment in accordance with an example embodiment.
Figure 21:
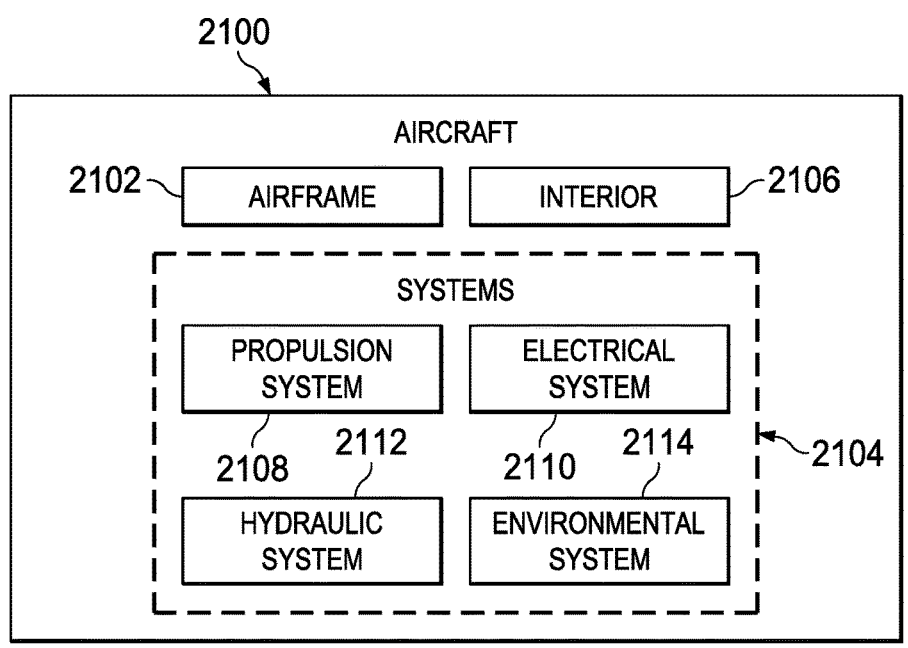
FIG. 21 is a block diagram of an aircraft in accordance with an example embodiment.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20. In particular, structure 104 from FIG. 1 may be manufactured during any one of the stages of aircraft manufacturing and service method 2000. For example, without limitation, assembly 110 may be built using plurality of parts 102 during at least one of component and subassembly manufacturing 2006, system integration 2008, routine maintenance and service 2014, or some other stage of aircraft manufacturing and service method 2000. Further, supervision and inspection system 112 may provide automated supervision and inspection of the assembly process 106 for building assembly 110. Supervision and inspection system 112 may be used to automate the supervision and inspection of a structure that is part of airframe 2102, interior 2106, or some other portion of aircraft 2100.

In one illustrative example, components or subassemblies produced in component and subassembly manufacturing 2006 in FIG. 20 may be fabricated or manufactured in a manner similar to components or subassemblies produced while aircraft 2100 is in service 2012 in FIG. 20. As yet another example, one or more apparatus embodiments, method embodiments, or a combination thereof may be utilized during production stages, such as component and subassembly manufacturing 2006 and system integration 2008 in FIG. 20. One or more apparatus embodiments, method embodiments, or a combination thereof may be utilized while aircraft 2100 is in service 2012 and/or during maintenance and service 2014 in FIG. 20. The use of a number of the different illustrative embodiments may substantially expedite the assembly of and/or reduce the cost of aircraft 2100.

Thus, the example embodiments provide automated systems and methods for supervision and inspection of an assembly process. Although the automated systems and methods for supervision and inspection may be used for the assembly of other types of vehicles and vehicle structures (e.g., automotive assembly, spacecraft assembly, etc.).

The example embodiments provide systems and methods for mapping a manufacturing environment in order to understand the manufacturing in three-dimensional form. Further, the systems and methods described perform three-dimensional map generation, three-dimensional object detection, three-dimensional site element detection, and three-dimensional feature detection based on three-dimensional sensor data to assess the quality of an assembly process and the assembly being built. In some illustrative examples, using three-dimensional data in the manner described above allows for certain features that are not detectable or not strongly detectable using only two-dimensional imaging data to be more readily and strongly detected. Thus, in some cases, using three-dimensional data may improve the overall accuracy of the quality evaluation of the assembly process and the assembly.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for performing automated supervision and inspection of an assembly process, the method being implemented using a computer system and comprising:
generating sensor data at an assembly site using a sensor system positioned relative to the assembly site;
generating, by the computer system, a three-dimensional global map for the assembly site and an assembly being built at the assembly site using the sensor data, wherein generating the three-dimensional global map comprises:
generating, by the computer system, a set of surface patches using the sensor data, each of the set of surface patches comprising one or more three-dimensional surfaces;
fitting, by the computer system, the set of surface patches with surfaces in a three-dimensional model of the assembly site and the assembly being built at the assembly site;
identifying, by the computer system, a current stage of an assembly process for building the assembly based on the three-dimensional global map;
identifying, by the computer system, a context for the current stage, the context including a first identification of steps completed prior to the current stage, a second identification of steps for completion during the current stage, and a third identification of next steps to be completed after the current stage; and
generating, by the computer system, a quality report for the assembly using the three-dimensional global map and the context for the current stage, the quality report including an overall stage assessment that indicates a quality of the current stage of the assembly process.

2. The method of claim 1, further comprising:
sending, by the computer system, the quality report to at least one remote device over at least one communications link for viewing by at least one human operator.

3. The method of claim 1, wherein generating the sensor data comprises:
generating three-dimensional data for the assembly site and the assembly using at least one of a light detection and ranging sensor, a radar sensor, a sonar sensor, or a stereo camera positioned relative to the assembly site and the assembly at the assembly site.

4. The method of claim 3, wherein generating, by the computer system, the three-dimensional global map comprises:

generating, by the computer system, a three-dimensional point cloud of the assembly site and the assembly being built at the assembly site using the three-dimensional data.

5. The method of claim 4, wherein generating the set of surface patches comprises:
   clustering, by the computer system, points in the three-dimensional point cloud to form the set of surface patches.

6. The method of claim 5, wherein fitting the set of surface patches with the surfaces in the three-dimensional model comprises:
   fitting, by the computer system, the set of surface patches with the surfaces in the three-dimensional model using at least one of radial basis functions, spline approximations, or mesh interpolations.

7. The method of claim 5, wherein generating, by the computer system, the three-dimensional global map further comprises:
   organizing, by the computer system, the set of surface patches that have been fitted to the surfaces in the three-dimensional model into the three-dimensional global map.

8. The method of claim 1, wherein the sensor data includes two-dimensional imaging data and three-dimensional data, and the method further comprises:
   generating, by the computer system, a quality report using the two-dimensional imaging data and the context for the current stage;
   integrating, by the computer system, the quality report generated using the three-dimensional global map and the quality report generated using the two-dimensional imaging data into a master quality report, wherein the integrating comprises consolidating redundant detections of undesired features into a single detection.

9. The method of claim 1, wherein identifying, by the computer system, the current stage of the assembly process comprises:
   detecting, by the computer system, a plurality of objects using the three-dimensional global map; and
   matching, by the computer system, at least a portion of the plurality of objects to parts for the assembly using at least one of images of the parts or models of the parts, wherein the at least the portion of the plurality of objects matched to the parts is a plurality of matched objects.

10. The method of claim 9, wherein identifying, by the computer system, the current stage of the assembly process comprises:
    detecting, by the computer system, a plurality of site elements within the three-dimensional global map; and
    identifying, by the computer system, the current stage of the assembly process based on the plurality of matched objects and the plurality of site elements.

11. The method of claim 9, wherein identifying, by the computer system, the current stage of the assembly process further comprises:
    determining, by the computer system, at least one of a plurality of locations or a plurality of orientations for the plurality of matched objects with respect to a reference coordinate system for the assembly site; and
    determining, by the computer system, the current stage of the assembly process based on an identification of the plurality of matched objects and the at least one of the plurality of locations or the plurality of orientations for the plurality of matched objects.

12. The method of claim 11, wherein identifying, by the computer system, the context comprises:
    determining, by the computer system, the context for the current stage of the assembly process using context information stored in a data repository, wherein the context further includes at least one of a nominal condition for the assembly at the current stage, a nominal condition for each part expected to be present at the current stage, or selected tolerances for the nominal condition for the assembly at the current stage.

13. The method of claim 11, wherein generating, by the computer system, the quality report comprises:
    generating, by the computer system, a matching assessment that indicates whether one or more of the plurality of objects detected is unable to be matched to a corresponding part and whether one or more of the plurality of matched objects does not match a part that is expected to be present at the current stage of the assembly process.

14. The method of claim 11, wherein generating, by the computer system, the quality report comprises:
    generating, by the computer system, a location assessment that indicates whether each of the plurality of matched objects has been assembled in a correct or incorrect location based on the context for the current stage of the assembly process.

15. The method of claim 11, wherein generating, by the computer system, the quality report comprises:
    generating, by the computer system, an inconsistency assessment that indicates whether any features have been identified and whether any identified features are outside of selected tolerances, wherein a feature is selected from one of a crack, a dent, a twist, or a surface level feature.

16. The method of claim 15, further comprising:
    detecting, by the computer system, one or more features in the assembly using at least one three-dimensional comparison algorithm.

17. The method of claim 1, further comprising:
    generating, by the computer system, guidance information for guiding a human operator during the assembly process based on the context for the current stage of the assembly process.

18. The method of claim 17, wherein generating the guidance information comprises:
    generating, by the computer system, current stage guidance for use by the human operator to perform one or more tasks during the current stage of the assembly process.

19. The method of claim 17, wherein generating the guidance information comprises:
    generating, by the computer system, next stage guidance for use by the human operator to perform one or more tasks during a next stage of the assembly process.

20. The method of claim 17, further comprising:
    displaying, by the computer system, the guidance information on a display system positioned relative to the assembly site.

21. The method of claim 1, further comprising:
    storing, by the computer system, the quality report as part of a record corresponding to the current stage of the assembly process in a data repository to thereby build a history of records for the assembly process.

22. The method of claim 21, further comprising:
    determining, by the computer system, whether the quality report for the current stage of the assembly process indicates that an issue of interest is present; and rolling back through the history of records, via the computer system, in a reverse order to identify a root cause of the issue of interest.

23. A method for performing automated supervision and inspection of an assembly process, the method being implemented using a computer system and comprising:
generating sensor data at an assembly site using a sensor system positioned relative to the assembly site, wherein the sensor data includes two-dimensional imaging data and three-dimensional data;
generating, by the computer system, a three-dimensional global map for the assembly site and an assembly being built at the assembly site using the sensor data;
identifying, by the computer system, a current stage of an assembly process for building the assembly at the assembly site using the three-dimensional global map and assembly information stored in a data repository;
identifying, by the computer system, a context for the current stage, the context including a first identification of steps completed prior to the current stage, a second identification of steps for completion during the current stage, and a third identification of next steps to be completed after the current stage;
generating, by the computer system, a quality report corresponding to the current stage of the assembly process based on the three-dimensional global map, the assembly information, and the context for the current stage, the quality report including an overall stage assessment that identifies a grade for the current stage of the assembly process, the grade identifying a quality of the current stage of the assembly process;
generating, by the computer system, a quality report using the two-dimensional imaging data and the context for the current stage;
integrating, by the computer system, the quality report generated based on the three-dimensional global map and the quality report generated using the two-dimensional imaging data into a master quality report, wherein the integrating comprises consolidating redundant detections of undesired features into a single detection; and
storing, by the computer system, a record corresponding to the current stage of the assembly process in the data repository to thereby build a history of records for the assembly process, wherein the record includes at least one of the three-dimensional global map, at least a portion of the sensor data, or the master quality report.

24. The method of claim 23, further comprising:
determining, by the computer system, whether the master quality report for the current stage of the assembly process indicates that at least one issue of interest is present, wherein the at least one issue of interest is selected from one of an improper part, an improper part location, an improper orientation, a crack, a dent, a twist, and a surface inconsistency.

25. The method of claim 24, further comprising:
rolling back through the history of records, via the computer system, to identify a root cause of the at least one issue of interest.

26. The method of claim 23, further comprising:
generating, by the computer system, at least one of current stage guidance or next stage guidance for use by a human operator during the assembly process.

27. The method of claim 26, further comprising:
displaying, by the computer system, the at least one of the current stage guidance or the next stage guidance on a display system.

28. The method of claim 23, further comprising:
presenting, by the computer system, at least a portion of the master quality report on a display system to inform a human operator of the master quality report, wherein the overall stage assessment includes a grade that indicates how the current stage has progressed with respect to selected tolerances.

29. A system for automated supervision and inspection of an assembly process, the system comprising:
a sensor system positioned relative to an assembly site and an assembly being built at the assembly site; and
a computer system that generates a three-dimensional global map for the assembly site and an assembly being built at the assembly site using sensor data generated by the sensor system; identifies a current stage of the assembly process for building the assembly at the assembly site based on the three-dimensional global map; identifies a context for the current stage, the context including a first identification of steps completed prior to the current stage, a second identification of steps for completion during the current stage, and a third identification of next steps to be completed after the current stage; and generates a quality report for the assembly using the three-dimensional global map and the context for the current stage, the quality report including an overall stage assessment that indicates a quality of the current stage of the assembly process;
wherein generating the three-dimensional global map comprises:
generating, by the system, a set of surface patches using the sensor data, each of the set of surface patches comprising one or more three-dimensional surfaces; and
fitting, by the system, the set of surface patches with surfaces in a three-dimensional model of the assembly site and the assembly being built at the assembly site.

30. The system of claim 29, wherein:
the sensor system includes at least one of a light detection and ranging sensor, a radar sensor, a sonar sensor, or a stereo camera and wherein the sensor system generates three-dimensional data;
generating the set of surface patches comprises:
generating, by the system, a three-dimensional point cloud of the assembly site and the assembly being built at the assembly site using the three-dimensional data; and
clustering, by the system, points in the three-dimensional point cloud to form the set of surface patches.

31. The system of claim 29, wherein the computer system identifies the current stage of the assembly process using the three-dimensional global map and assembly information stored in a data repository.

32. The system of claim 31, wherein the assembly information includes at least one of a part images library, a part models library, assembly process flow data, assembly site model data, assembly model data, assembly video data, or feature data.

33. The system of claim 29, wherein the context further includes at least one of a nominal condition for the assembly at the current stage, a nominal condition for each part expected to be present at the current stage, or selected tolerances for the nominal condition for the assembly at the current stage.

* * * * *